US006932703B1

(12) United States Patent
Ritchie

(10) Patent No.: US 6,932,703 B1
(45) Date of Patent: Aug. 23, 2005

(54) METHOD AND APPARATUS FOR A SLOT MACHINE GAMING DEVICE SIMULATING A BANK ROBBERY

(76) Inventor: Steven S. Ritchie, 1310 Quail Ridge Way, Hollister, CA (US) 95023

( * ) Notice: Subject to any disclaimer, the term of this patent is extended or adjusted under 35 U.S.C. 154(b) by 12 days.

(21) Appl. No.: 10/365,557

(22) Filed: Feb. 12, 2003

Related U.S. Application Data

(60) Provisional application No. 60/356,555, filed on Feb. 12, 2002.

(51) Int. Cl.[7] .................................................. G06F 9/24
(52) U.S. Cl. ........................ 463/20; 463/16; 273/143 R
(58) Field of Search ................. 463/16, 20; 273/143 R

(56) References Cited

U.S. PATENT DOCUMENTS

| | | | | |
|---|---|---|---|---|
| 4,624,459 | A | | 11/1986 | Kaufman |
| 4,652,998 | A | | 3/1987 | Koza et al. |
| 4,932,665 | A | | 6/1990 | Fejdasz et al. |
| 5,393,057 | A | | 2/1995 | Marnell, II |
| 5,397,125 | A | | 3/1995 | Adams |
| 5,409,225 | A | | 4/1995 | Kelly et al. |
| 5,700,008 | A | * | 12/1997 | Lawlor et al. ........... 273/118 A |
| 5,919,088 | A | * | 7/1999 | Weiss ............................ 463/9 |
| 5,971,850 | A | | 10/1999 | Liverance |
| 6,154,201 | A | | 11/2000 | Levin et al. |
| 6,155,926 | A | | 12/2000 | Miyamoto et al. |
| 6,267,673 | B1 | | 7/2001 | Miyamoto et al. |
| D465,531 | S | * | 11/2002 | Luciano, Jr. et al. ...... D21/333 |

FOREIGN PATENT DOCUMENTS

GB 2144644 A * 3/1985 ............. A63F 9/22

OTHER PUBLICATIONS

"Safe Crackers" The Price is Right. 1976-Present [on-line], [retrieved on Oct. 16, 2003] Retrieved from the Internet: <URL: http://gscentral.net/safe.htm>.*

"Medieval Madness" Operations Manual. Williams Electronic Games, Inc. Jul. 1997.*

Kerins, Bowen. "Pinball Archive Rule Sheet: Medieval Madness". Jan. 29, 1997. [online], [retrieved on Aug. 25, 2004] Retrieved from the Internet: <URL: http://www.pinball.org/rules/medievalmadness.html>.*

"Williams: Medieval Madness pinball game". 1997. [online], [retrieved on Aug. 25, 2004] Retrieved from the Internet: <URL:http://www.pinball.wms.com/games/medieval/>.*

(Continued)

*Primary Examiner*—Julie Brocketti
(74) *Attorney, Agent, or Firm*—Patzik, Frank & Samotny Ltd.

(57) ABSTRACT

A slot machine game that simulates a bank robbery is provided having a vault mechanical assembly that includes a plurality of doors and gates that may be sequentially opened by attaining winning outcomes at successive levels of the game. Upon completion of each level of the game, the game allows the player to either risk the player's winning and proceed to the next level or "cash out", thereby adding excitement to the game. In order to provide visual stimulation, the vault doors and gates are moveable between a closed and an open position during operation of the game. Simulated sounds such as explosions may also be used to enhance the enjoyment of the game and to attract attention to the game.

48 Claims, 40 Drawing Sheets

OTHER PUBLICATIONS

"Safe Cracker Operators Handbook". Bally. Apr. 1996.*

"Bally: Safe Cracker" 1996. [online][retrieved on Aug. 25, 2004] Retrieved from the Internet: <URL: http://www.pinball.com/games/safecracker/>.*

M. Coriale, "Safe Cracker" Pinball Archive Rule Sheet: Safe Cracker. Oct. 29, 1996. [online][retrieved Aug. 25, 2004] Retrieved from the Internet: <URL: http://www.pinball.org/rules/safecracker.html>.*

Morrey, Fox (Mike), "Safe Cracker" Pinball Archive Rule Sheet: Safe Cracker. [online][retrieved on Aug. 25, 2004] Retrieved from the Internet: <URL: http://www.pinball.org/rules/safecracke2r.html>.*

"Monopoly". Stern Pinball. Oct. 2001, [online], [retrieved on Aug. 26, 2002]. Retrieved from the Internet: <URL: http://www.pinballzone.com/monopoly/index.php>.*

Tiesma, scott. "WhoDunnit?" Pinball Archive Rule Sheet. Dec. 11, 1995, [online], [retrieved on Aug. 26, 2004]. Retrieved from the Internet: <URL: http://www.pinball.org/rules/whodunnit.html>.*

* cited by examiner

METHOD AND APPARATUS FOR A SLOT MACHINE GAMING DEVICE SIMULATING A BANK ROBBERY

This application claims priority based upon U.S. Provisional Patent Application Ser. No. 60/356,555, filed Feb. 12, 2002.

FIELD OF THE INVENTION

This invention relates generally to a gaming device, and more particularly to a slot machine gaming device that simulates a bank robbery, and still more particularly to a slot machine gaming device that simulates a bank robbery wherein multiple levels of a game must be successfully played in order to successively remove each layer of a series of gates and vault doors to reveal prizes and/or an opportunity to continue playing to win additional prizes.

BACKGROUND OF THE INVENTION

A conventional slot machine typically includes three or more rotatable reels disposed in at least one horizontal row. These reels have various symbols arranged in different sequences around their peripheral surfaces. The reels are respectively coupled to drive shafts of step motors. The traditional three-reel slot machine has a glass panel on the front, through which the player can view the spinning reels. To activate the slot machine, a player inserts one or more coins or tokens, and then pulls a handle or presses a "SPIN" button to cause a mechanical linkage to commence the spinning of the reels. As the reels slow down, the first reel stops, followed by the second reel and finally the third reel, thereby displaying a combination of three of the symbols (one from each reel) in a row.

Ordinarily, in three-reel type slot machines, one to five winning "payout lines" (e.g., three horizontal and two diagonal lines) can be provided across the glass panel such that three symbols appear on each line when the reels stop. Depending upon the number of coins or tokens inserted for a game, one or more of these winning lines are effectuated for the game. If three symbols aligned in any of the effective winning lines constitute one of the predetermined winning symbol combinations, a number of tokens are paid out or credits are accrued on the machine according to the rank of the prize assigned to the winning symbol combination.

Over the years and in keeping with the changes in technology, slot machines have evolved from purely mechanical devices, through electro-mechanical devices to the present day slot machines, which include both video and electromechanical slot machine devices. While slot machines may be played in, among other places, most casinos, traditional slot machines often fail to operate at a level challenging or interesting enough to attract new players or keep a player's interest for considerable periods of time. In particular, players often become frustrated after repeated or quick losses. Furthermore, conventional slot machines are typically viewed by most players as too simplistic because conventional slot machines require little or no decision making, skill or strategy on the part of the player (other than how much to wager).

Several prior art games have attempted to provide interesting variations on slots machines. U.S. Pat. No. 5,919,088 discloses a method and apparatus for a gaming machine wherein the player can win directly by achieving an outcome or indirectly by "solving" the combination to a simulated safe. The combination is solved by having the numbers for the combination incrementally and automatically advance every time a game is lost until each of the numbers are correctly identified. However, this and other known slot machine games do not provide the player with multiple levels of play wherein the player must make decisions on how and whether to proceed with the next level. Nor do they add mechanical aspects or components to the game.

Indeed, there is a constant need in the gaming industry to devise new games that keep players interested to substantially reduce the possibility that players will cease playing or reduce the amount that they play due to a perceived lack of interest or challenge. Accordingly, there is a need for a new type of slot machine game that is exciting, challenging, and capable of attracting players and maintaining the players' interest.

Therefore, it is a first object of the present invention to provide an electronic game that is capable of attracting players because of its visual and audio display capabilities.

It is a second object of the present invention to provide an electronic game that is easy to play, yet captivates the interest of the player.

Yet another object of the game is to combine mechanical components and simulated video components of a bank robbery into a combined overall game.

Another object of the invention is to combine a mechanical component with a traditional electromechanical reel slot machine or video slot, to provide a much more exciting game play experience.

It is another object of the present invention to provide a game that can be implemented on a video gaming machine in a casino for gambling purposes.

Yet another object of the present invention is to provide a gaming machine that contains multiple nested layers of doors or gates, such as those associated with a bank vault that need to be opened by attaining winning results at various game levels to provide the player with a chance to win prizes.

Yet another object of the present invention is to provide a gaming machine that combines characteristics of slot machines with mechanical components that progressively remove layers of obstacles as different levels of the game are successfully played.

An additional object of the present invention is to simulate the steps needed to defeat or overcome different levels of security and break into a bank vault.

It is another object of the present invention to provide a player with a consolation prize if the player does not win the game in order to maintain a player's interest.

It is another object of the present invention to provide a slot machine game that requires more decision making by the player.

It is yet another object of the present invention to provide a system of moveable horizontal and vertical gates and doors to reveal a jackpot, prize or bonus screen once the gates are opened.

Another object of the present invention is to provide a slot machine game that is capable of simulating the visual and audio effects of a bank robbery.

A still further object of the present invention is to provide a slot machine game that simulates a bank robbery that is easy and economical to manufacture.

SUMMARY OF THE INVENTION

The above and other objects, features and advantages of the invention will become readily apparent from the following detailed description thereof, which is to be read in connection with the accompanying drawings.

The above-listed objects are met or exceeded by the present slot machine game wherein a slot machine game is provided having a vault mechanical assembly that includes a plurality of doors and gates that may be sequentially opened by attaining winning outcomes at successive levels of the game. Upon completion of each level of the game, the game allows the player to either risk the player's winning and proceed to the next level or "cash out", thereby adding excitement to the game. In order to provide visual stimulation, the vault doors and gates are moveable between a closed and an open position during operation of the game. Simulated sounds such as explosions may also be used to enhance the enjoyment of the game and to attract attention to the game. Gears or other actual or simulated machine parts also may be located on the slot machine along with lights or other displays to provide for additional stimuli. The slot machine may also contain lights to simulate electrical sparks, fire, explosions and the like during the course of play.

The slot machine game comprises: an upper vault cabinet for housing a vault mechanical assembly, and a lower slot machine housing for housing a slot machine assembly. Preferably, the slot machine assembly controls the mechanical vault assembly during the operation of the slot machine. The slot machine assembly includes a microprocessor for executing one or more programs stored in memory, a video screen display, a selection or input device to allow the player to interact with the slot machine, and a power supply.

The vault mechanical assembly includes an outer closure and an inner closure that may be opened during play of the game. In the preferred embodiment, the closures represent gates or doors that simulate the security gates commonly used in banks and the like. For example, the outer closure may include a pair of horizontally-opened outer gates comprised of a series of vertical rods and a vertically-opened inner gate comprised of a series of horizontal rods. The rods include sliding members at their ends for moving within tracks affixed to the vault mechanical assembly. The sliding members for each rod are preferably pivotally linked to one another to permit the gates to move along the track to open or close the gates. The inner closure preferably includes one or more doors that may be pivotally attached by a hinge to pivot between a closed and open position. In the preferred embodiment, the doors simulate bank vault doors that may be opened to reveal a bank vault.

In order to open the gates and doors, the player must achieve a series of predetermined winning results. In the preferred embodiment, if the player achieves a winning result at the first level, the outer gates will open and the player will be provided with the option of cashing out or proceeding to try and open the inner gate. Should the player move on and achieve a winning result at the next level, the inner gate will open and the player will again be provided with a choice of cashing out or proceeding to open the vault doors. If the player moves on and achieves a winning result at the next level, the vault doors will open. The player may then be prompted to cash out or open a set number of money bags. If during the play of the game, a winning result is not won, the gates and doors, if necessary, will return to the closed position and the player may be awarded a consolation prize.

In order to increase excitement and interest in the game, the various levels, as described above, are associated with the various steps in "breaking into" the vault. For example, the first level may require a winning combination such as three sleeping guards or three dollar signs in one of the selected winning lines to proceed. If a winning combination is achieved, a simulated explosion may be heard and appear visually on the screen. Additionally, various lights and gears on the machine may also be activated to indicate a winning combination. The next level may require a correct access code to be inputted to "disable the alarm system" using the input and selection device. Last, a player may have to select a combination of explosives from a series of explosive charges in an effort to blow open the bank vault doors. Multiple attempts also may be provided for one or more of the levels to provide for a greater possibility of a winning result.

A method is also provided for playing the simulated bank robbery game having multiple levels on a slot machine, wherein the method comprises the steps of initiating the game; providing a first game level to be played; determining whether a winning result has occurred for the first level; inquiring whether the player would like to "cash out" or continue playing if a winning result was achieved for the first level; providing a second game level to be played if the player elects to proceed to the next level; determining whether a winning result was achieved for the second level; inquiring whether the player would like to "cash out" or continue playing if a winning result was achieved for the second level; providing a third game level to be played if the player elects to proceed to the next level; determining whether a winning result was achieved for the third level; and determining the amount the player may have won.

In one embodiment, after the player selects the desired number of winning lines to play in the slot machine game, the player inputs money, tokens or the like to initiate the start of the game. The player may then push a "spin" button or the like to spin the reels. If a predetermined winning result is achieved in one of the selected lines, a simulated explosion will occur and the outer gates will open indicating that the player has won the first level. The game will then inquire whether the player would like to cash out or proceed to the next level. If the player cashes out, he or she may play the game again starting at the first game level.

If the player elects to proceed to next level, the player may be provided several attempts to enter the correct security access code to disable the alarm system. If the player does not successfully enter the access code, the game will end. Thereafter, the outer gates will close and the player may be provided with a consolation prize reward. Should the player enter the correct access code, the inner gate will proceed to be opened indicating that the player has won the second level of the game. The player may then elect to continue to the third level or cash out.

Proceeding to the next level allows the player the opportunity to proceed to try and open the bank vault doors by selecting from a series of explosive charges that may be placed around the bank vault doors. In one embodiment, the player selects the corresponding detonators for the desired explosive charges. If the selected charges are either too much or too little, the game will end and the player may be provided with a consolation prize award. Should the player choose the correct amount of explosives, the bank vault doors will open. The player may then either take a predetermined award amount or select one or more money bags.

BRIEF DESCRIPTION OF THE DRAWINGS

Other objects and advantages of the invention will become apparent upon reading the following detailed description and upon reference to the drawings in which:

FIG. 7AA is a front elevational view of one embodiment of the outer gate and housing of the slot machine of the present invention showing the outer gate in the closed position.

FIG. 7BB is a top plan view of the outer gate and housing from FIG. 7AA.

FIG. 7CC is a side elevational view of the outer gate and housing from FIG. 7AA.

FIG. 7DD is a front elevational view of the outer gate and housing showing the outer gate in the open position.

WRITTEN DESCRIPTION OF THE INVENTION

Figure 1:
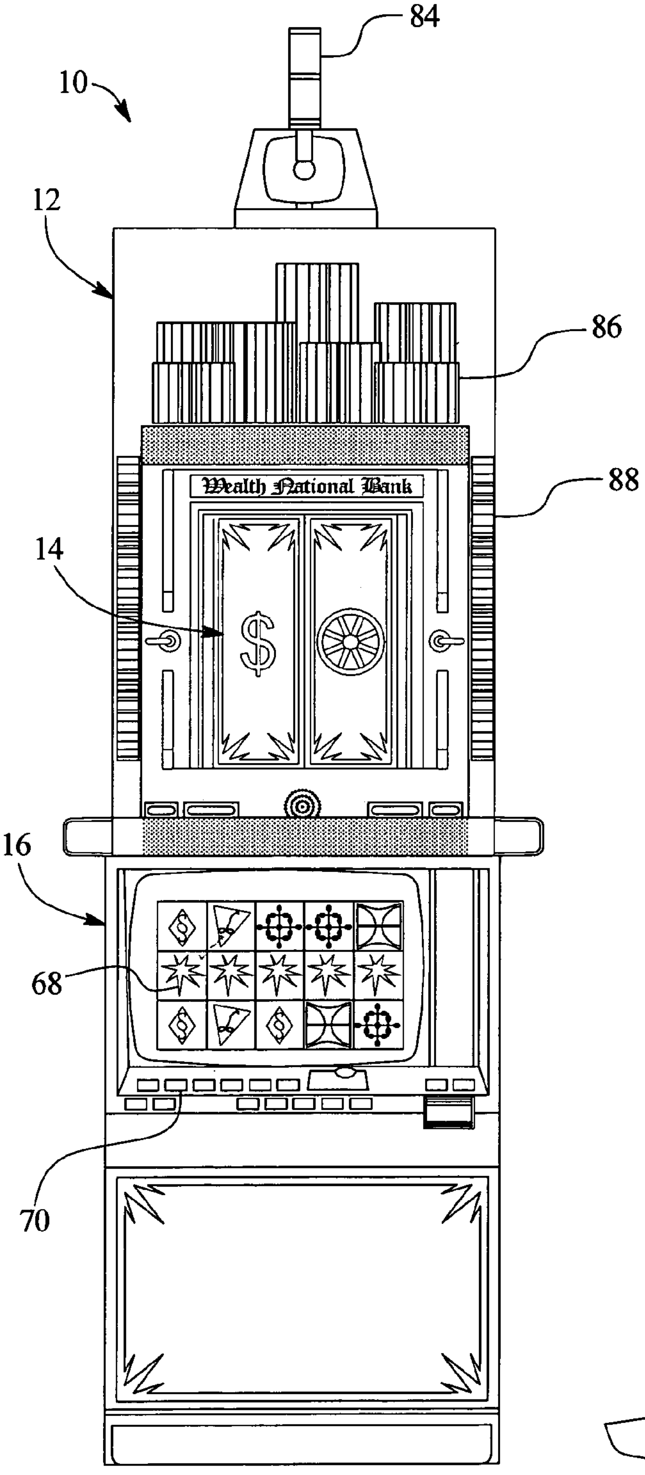
FIG. 1 is a front elevational view of one embodiment of the slot machine of the present invention.

While this invention is susceptible of embodiment in many different forms, there is shown in the drawings and will herein be described in detail, one or more specific embodiments, with the understanding that the present disclosure is to be considered merely an exemplification of the principles of the invention and is not intended to limit the invention only to the embodiments described and illustrated.

Figure 1A:
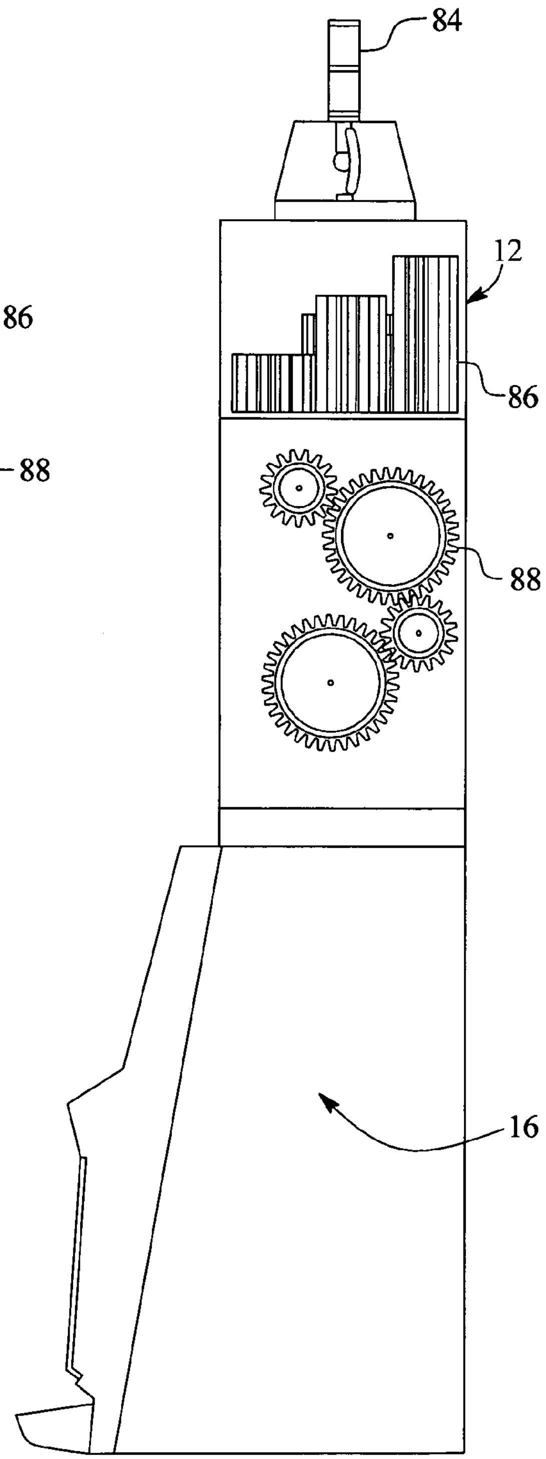
FIG. 1A is a side elevational view of the slot machine of FIG. 1 showing a series of gears on the exterior of the machine.

Referring to the drawings in detail, and initially to FIGS. 1 and 1A thereof, a slot machine of the present invention, generally designated by the number 10, is shown. The slot machine 10 includes an upper vault cabinet 12 for housing a vault mechanical assembly 14, and a lower slot machine housing 16 for housing a slot machine assembly 62 (see FIG. 2). As will be further discussed below, the slot machine assembly 62 controls the mechanical vault assembly 14 during the operation of the slot machine 10.

The slot machine 10 also preferably has various audio and visual stimuli to enhance the enjoyment of playing the game and to attract attention to the machine. While a wide variety of lights and mechanical machinery may be used, it is preferred that the visual stimuli include lights 84 and a plurality of gears 86 and 88. As shown in FIGS. 1 and 1A, the light may be a flashing red light 84 on top of the machine. Alternate lights include but are not limited to xenon flashtubes capable of very bright flashes. The flashtubes may use red and blue filters to simulate electrical sparks, fire, explosions and fire works during play.

In the embodiment shown in the figures, the gears are located on top of the vault assembly and on the side of the machine. In the preferred embodiment, the gears may rotate to simulate movement of various parts of the machine and to attract attention. The machine also preferably provides for audio in a known way to provide sounds including, but not limited to, explosions and cop sirens.

Figure 2:
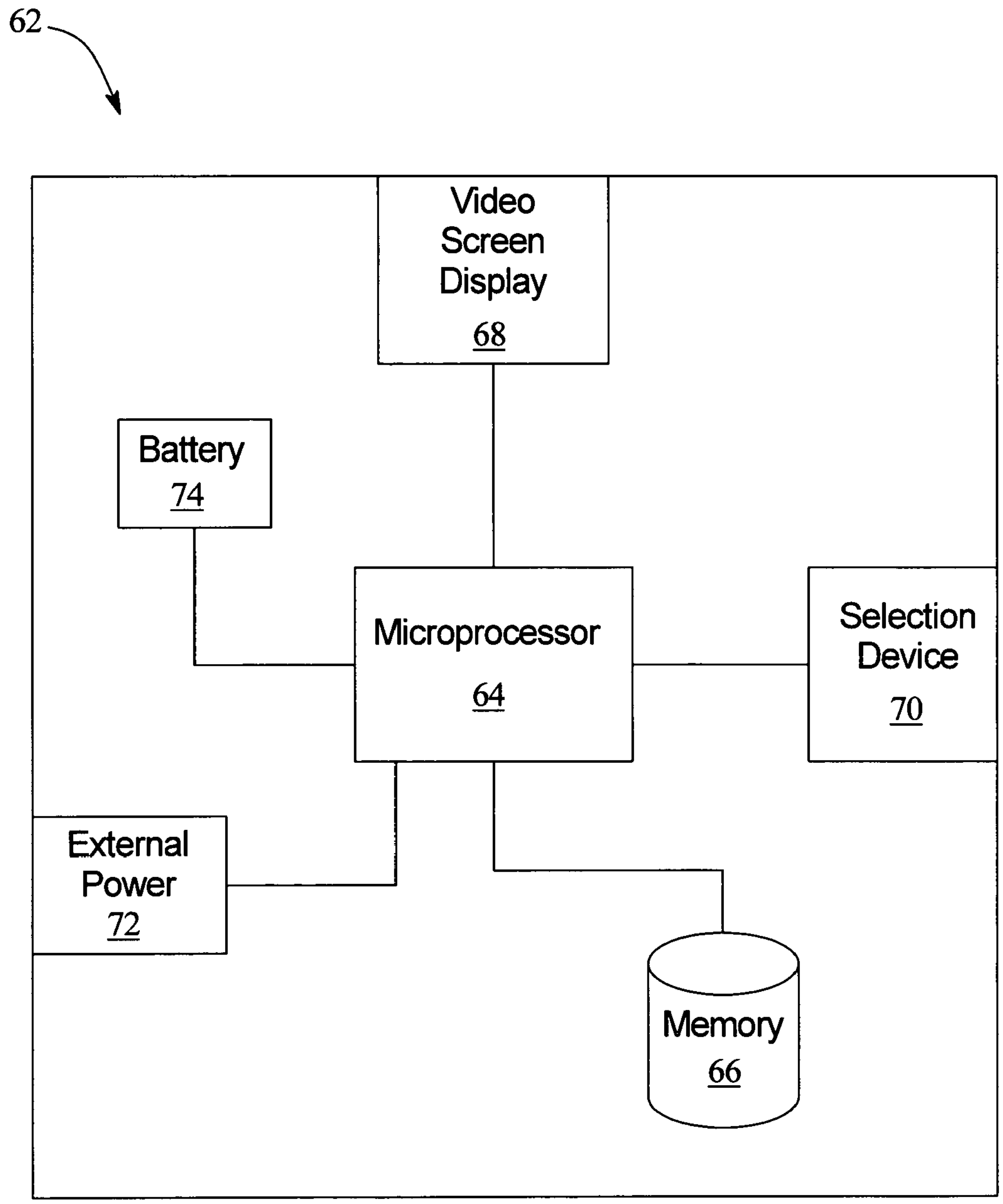
FIG. 2 is a schematic diagram of one embodiment of the slot machine assembly.

FIG. 2 is a schematic diagram of one embodiment of the slot machine assembly 62. The assembly 62 includes a microprocessor 64 for executing one or more programs stored in memory 66, a video screen display 68 (see also FIG. 1), a selection or input device 70 (see also FIG. 1) for providing a means by which the player interacts with the slot machine 10, and a power supply 72 and/or a battery 74 in electrical communication with each of the above-noted components, as well as with the vault mechanical assembly 14, to provide electrical power thereto. The memory 66, video screen display 68, selection device 70, and vault mechanical assembly 14 also are each in communication with and controlled by the microprocessor 64.

The selection or input device 70 may be any of the known selection or input devices including, but not limited to, a keypad, a peripheral device such as an external keyboard or mouse, and/or a plurality of function specific buttons. In the preferred embodiment, the video display screen 68 is a touch screen that serves as both the selection device 70 and the video screen display 68 wherein player selections are processed through tactile input. In this embodiment, the selection device 68 takes the form of "interactive" buttons that appear on the video screen display 68. When the player touches the video screen display 68 at the location where the "interactive" button is displayed, this has the same affect as if the player were pushing a conventional electro-mechanical keypad button.

Figure 3:
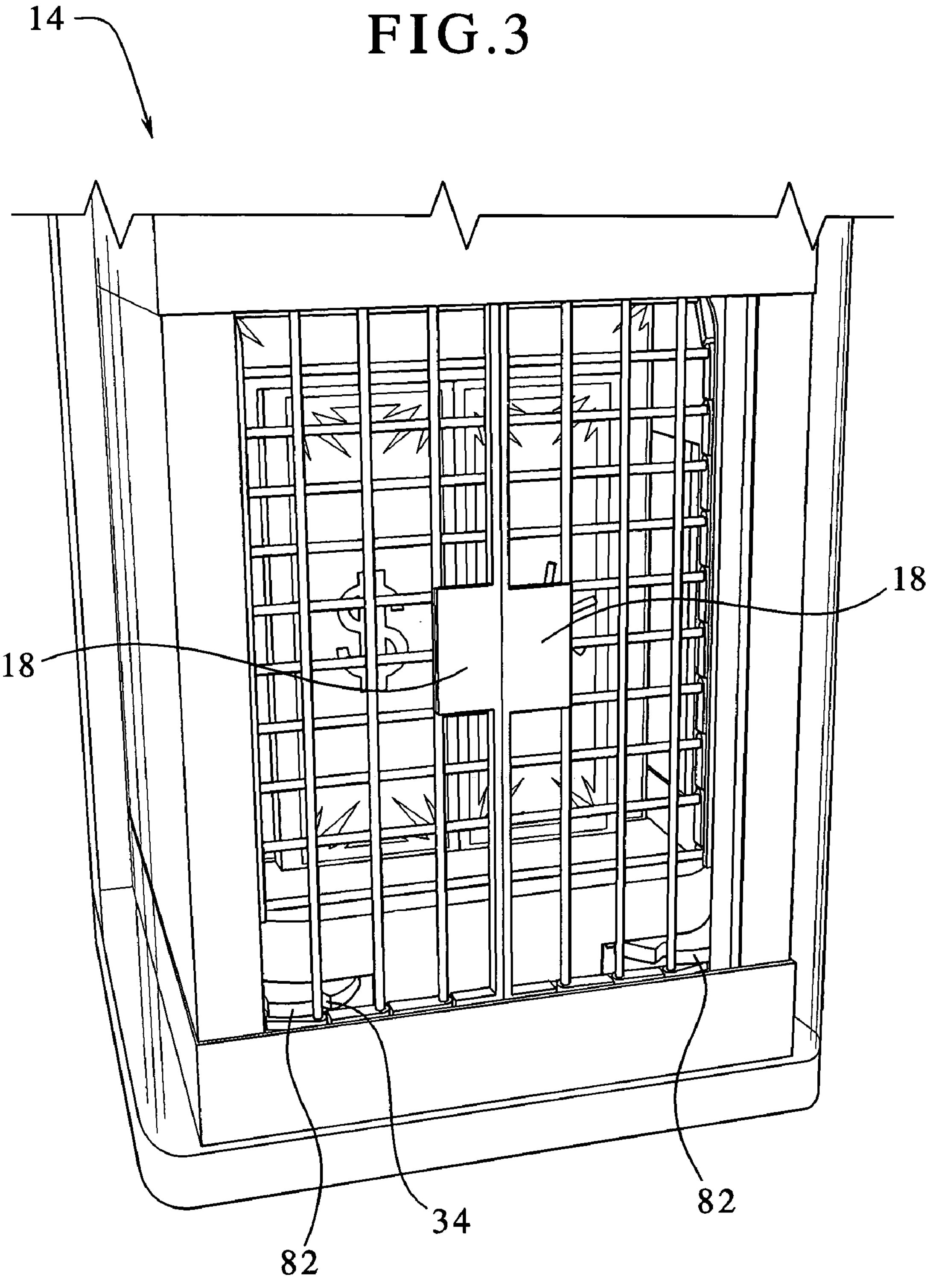
FIG. 3 is a front elevational view of one embodiment of the vault mechanical assembly of the present invention.
Figure 4:
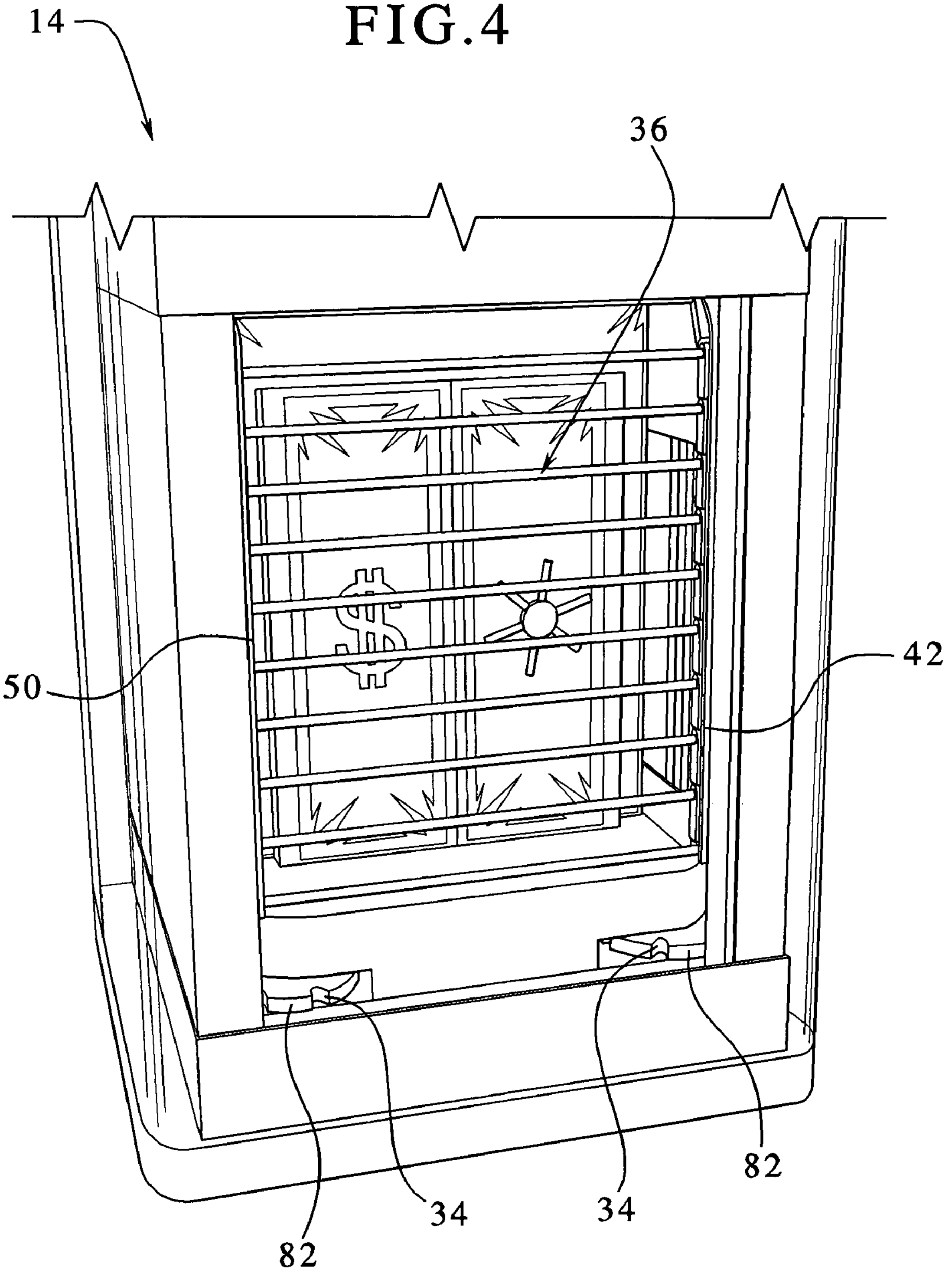
FIG. 4 is a front elevatational view of the vault mechanical assembly of FIG. 3 showing the outer gates in the open position and the inner gates in a closed position.

Referring now to FIG. 3, a front view of the mechanical vault assembly 14 is shown. As will be further discussed below, the vault assembly 14 includes a vault that is located behind an outer closure and an inner closure that are selectively opened and closed by the slot machine assembly 62 during play. In one embodiment, the outer closure includes a pair of horizontally-retractable outer gates 18, wherein each outer gate 18 retracts and extends, in opposing directions, between a closed position (as shown in FIG. 3) and a retracted or open position (as shown in FIG. 4). It is appreciated that the outer closure may comprise other types of closures including, but not limited to slidable or pivoting doors. While a microprocessor (not shown) preferably controls the movement and speed of the doors and gates through the use of sensors and detectors that detect the end of the desired travel by the gates and doors, it is appreciated that the gates and doors may be controlled through any known means.

Figure 5:
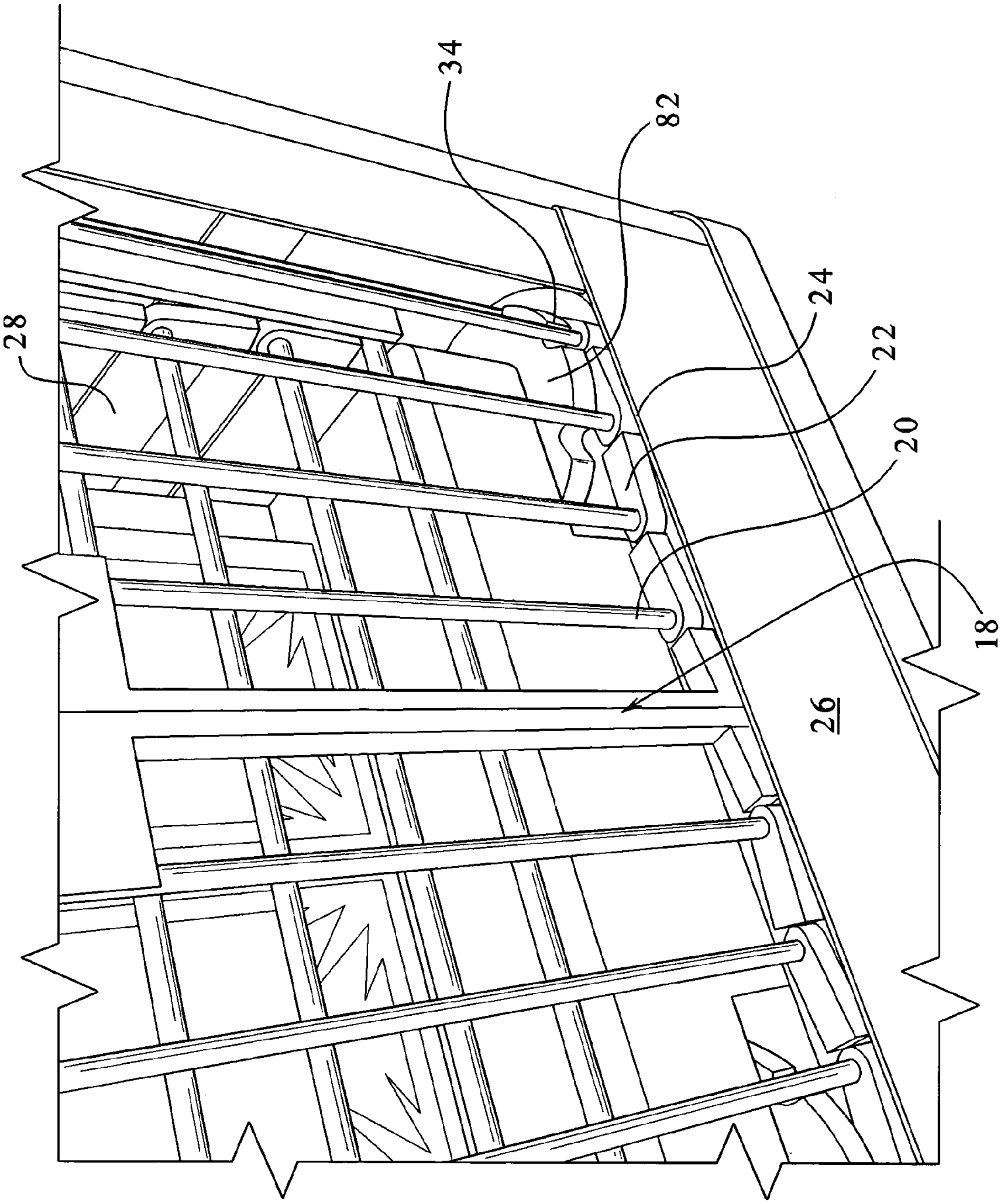
FIG. 5 is a partial perspective view of the vault mechanical assembly of FIG. 3 showing the bottom portion of the outer gate and the right side portion of the inner gate.
Figure 6:
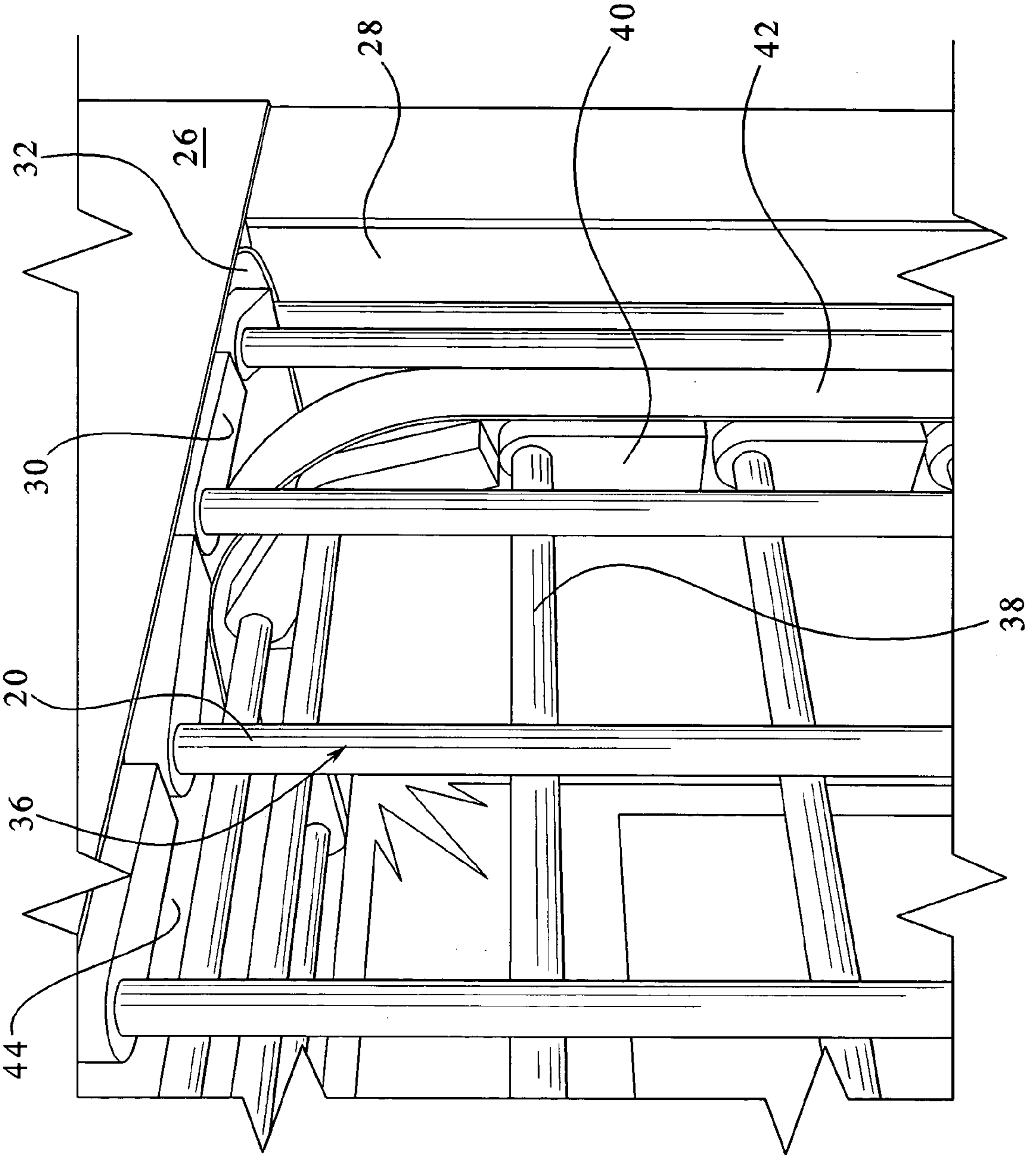
FIG. 6 is a partial perspective view of the vault mechanical assembly of FIG. 3 showing the upper portion of the outer gate and the right side portion of the inner gate.

Preferably, each outer gate 18 includes a plurality of links to simulate the security gates commonly used in banks and the like. As shown in FIGS. 5 and 6, each link includes a rod 20 that is fixedly connected to a bottom sliding member 22 proximate the bottom portion of the rod and to a top sliding member 30 proximate the top portion of the rod 20. The rod is preferably made of aluminum or plastic, but may be made of other material and not depart from the scope of the present invention. All of the bottom sliding members 22 are preferably slidably recessed within a continuous outer gate lower track 24 that extends along the bottom portion of the front 26 and sides 28 of the vault mechanical assembly 14. As shown in FIG. 5, the bottom sliding member 22 for each link is pivotally attached to the bottom sliding member 22 for each adjacent link to permit the sliding members 22 to move within the lower track 24 to open and close the outer gate 18.

The top sliding members 30 are slidably recessed within a continuous outer gate upper track 32 that extends along the upper portion of the front 26 and sides 28 of the vault mechanical assembly 14. As shown in FIG. 6, the top sliding member 30 for each link is pivotally attached to the top sliding member 30 for each adjacent link to permit the sliding members 30 to move within the upper track 32 to open and close the outer gate 18.

Referring again to FIG. 5 (showing the front, lower right side portion of the vault assembly), means for opening and closing each gate 18 is provided. In one embodiment, the means for opening and closing each gate 18 includes an outer gate motor subassembly operably associated with each gate 18. Each outer gate motor subassembly is preferably positioned proximal to either the upper track 32 or the lower track 24. The outer gate motor subassembly includes a selectively actuatable electrical motor (not shown) that is attached to the vault mechanical assembly 14 and is in electrical communication with and controlled by the slot machine assembly 62. It is appreciated that the motor can be any number of different motors including, but not limited to a DC motor or a step motor. Electrical power for the motor is preferably supplied by the battery 74 or external power supply 72, although it is appreciated that it may be supplied by a separate battery or other power sources.

The motor includes a rotatable drive shaft (not shown) fixedly attached to a horizontal cog gear 82. A plurality of notches 34 disposed along the periphery of the horizontal cog gear 82 matingly engage and drive the rods 20 in successive fashion as the cog gear 82 rotates. In particular, when the motor is actuated, the drive shaft rotates, thus causing the cog gear 82 to rotate. As the cog gear 82 rotates, the notches 34 successively engage a corresponding vertical rod 20, causing the sliding members 22, 30 of the outer gate 18 to slide within the tracks 24, 32. When viewed as in FIG. 5, the outer gate 18 is extended or closed when cog gear 82 rotates in a clock-wise direction and retracted or opened when the cog gear 82 is rotated in a counter-clockwise direction. It is appreciated that alternate means for opening and closing each outer gate 18 may be employed, such as a pulley subassembly or the like.

Figure 7B:
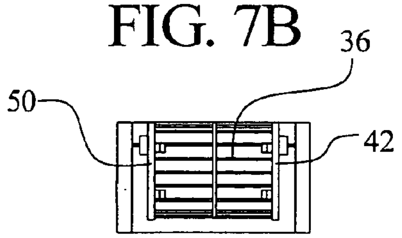
FIG. 7B is a top plan view of the housing and inner gate from FIG. 7A.
Figure 7A:
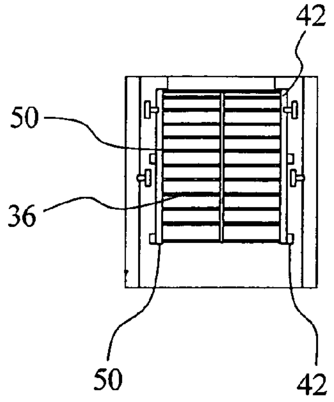
FIG. 7A is a front elevational view of one embodiment of the inner gate and housing of the slot machine of the present invention showing the inner gate in the closed position.
Figure 7C:
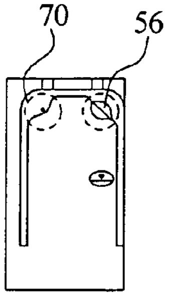
FIG. 7C is a side elevational view of the housing and inner gate from FIG. 7A.
Figure 7D:
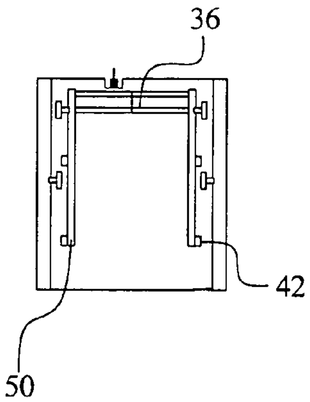
FIG. 7D is a front elavational view of the housing and inner gate from FIG. 7A showing the inner gate in the raised position.
Figure 7B:
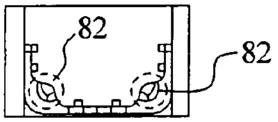
Figure 7A:
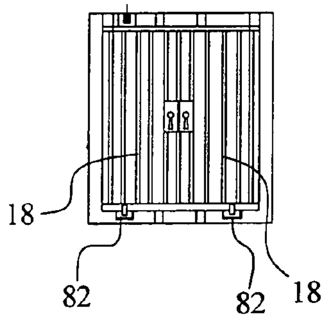
Figure 7C:
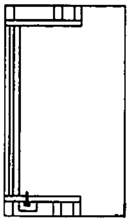
Figure 7D:
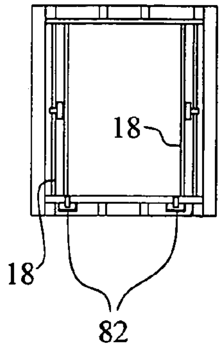
Figure 7E:
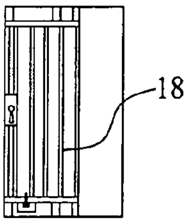
FIG. 7EE is a side elevational view of the outer gate and housing of FIG. 7DD.

FIGS. 7AA, BB and CC shows the outer gates 18 in the fully extended (or closed) position. As shown, cog gears 82 are provided at the front, bottom corners to drive the outer gates 18 open or closed depending upon which direction the cog gears 82 are driven. In FIGS. 7DD and 7EE, the horizontal outer gates 18 are shown in the open or retracted position.

Figure 8:
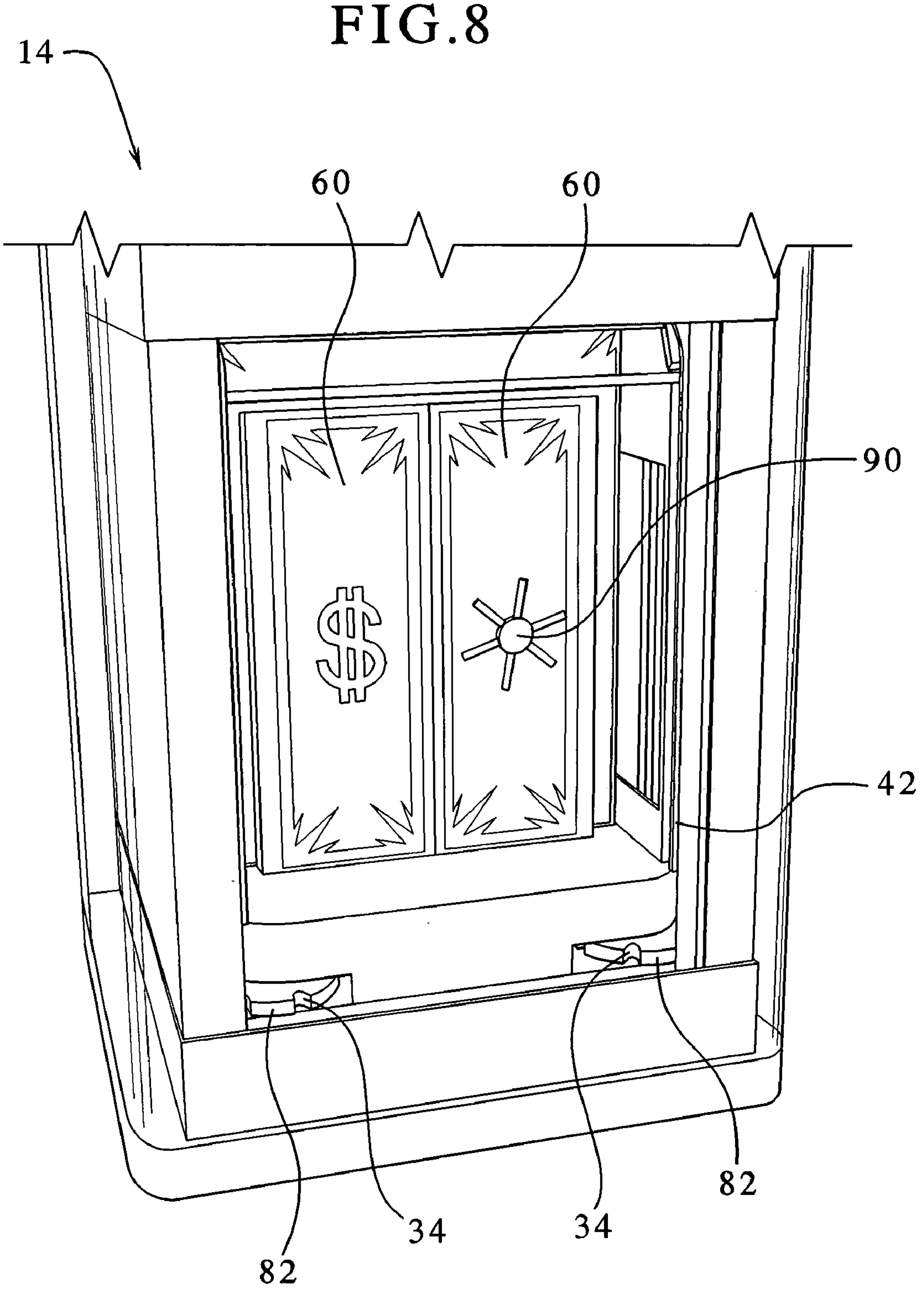
FIG. 8 is a front elevational view of the vault mechanical assembly of FIG. 3 showing the outer and inner gates in an open position and the doors in a closed position.
Figure 9:
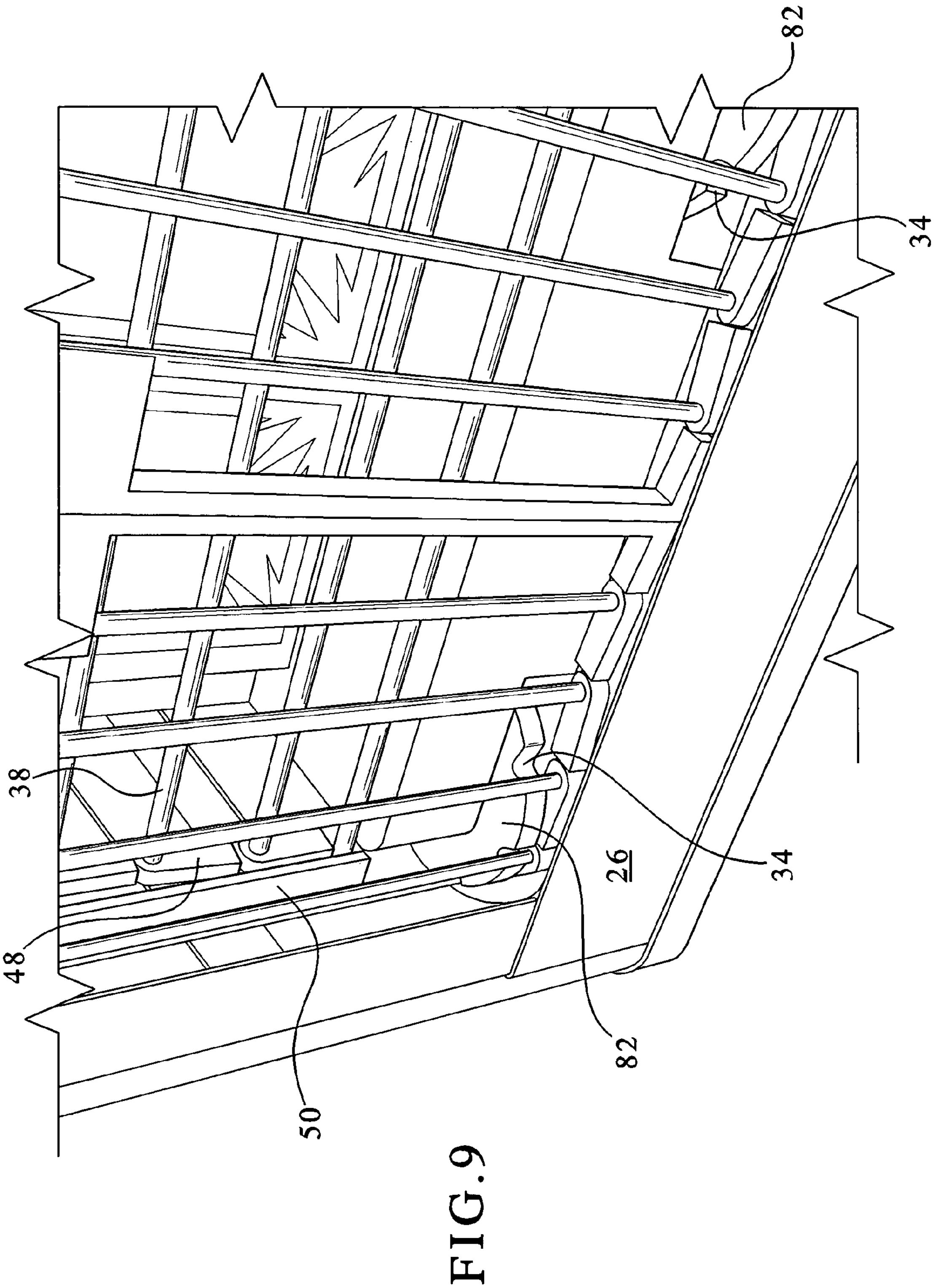
FIG. 9 is a partial perspective view of the vault mechanical assembly of FIG. 3 showing the left side of the inner gate.

The outer closure further includes a retractable roll-up inner gate 36 that moves or slides between a closed position (as shown in FIG. 4) and a retracted or open position (as shown in FIG. 8). Preferably, the inner gate 36 includes a plurality of links to simulate the security gates commonly used in banks and the like. As shown in FIGS. 5, 6 and 9, each link includes a rod 38 that is fixedly connected to a right sliding member 40 proximate the right-hand portion of the rod and to a left sliding member 48 proximate the left-hand portion of the rod 38. The rod is preferably made of aluminum or plastic, but may be made of other material and not depart from the scope of the present invention. All of the right side sliding members 40 are slidably recessed and received within a continuous inner gate right side track 42 that extends along the right side portion of the front, top and rear portions 26, 44 and 46, respectively, of the vault mechanical assembly 14. The right side sliding member 40 for each link is pivotally attached to the right side sliding member 40 for each adjacent link to permit the sliding members 40 to slide within the track 42 to open and close the inner gate 36.

All of the left side sliding members 48 are slidably recessed within a continuous inner gate left side track 50 that extends along the left side portion of the front, top and rear portions 26, 44 and 46, respectively, of the vault mechanical assembly 14. The left side sliding member 48 for each link is pivotally attached to the left side sliding member 48 for each adjacent link to permit the sliding members 48 to slide within the track 50 to open and close the inner gate 36.

Figure 12:
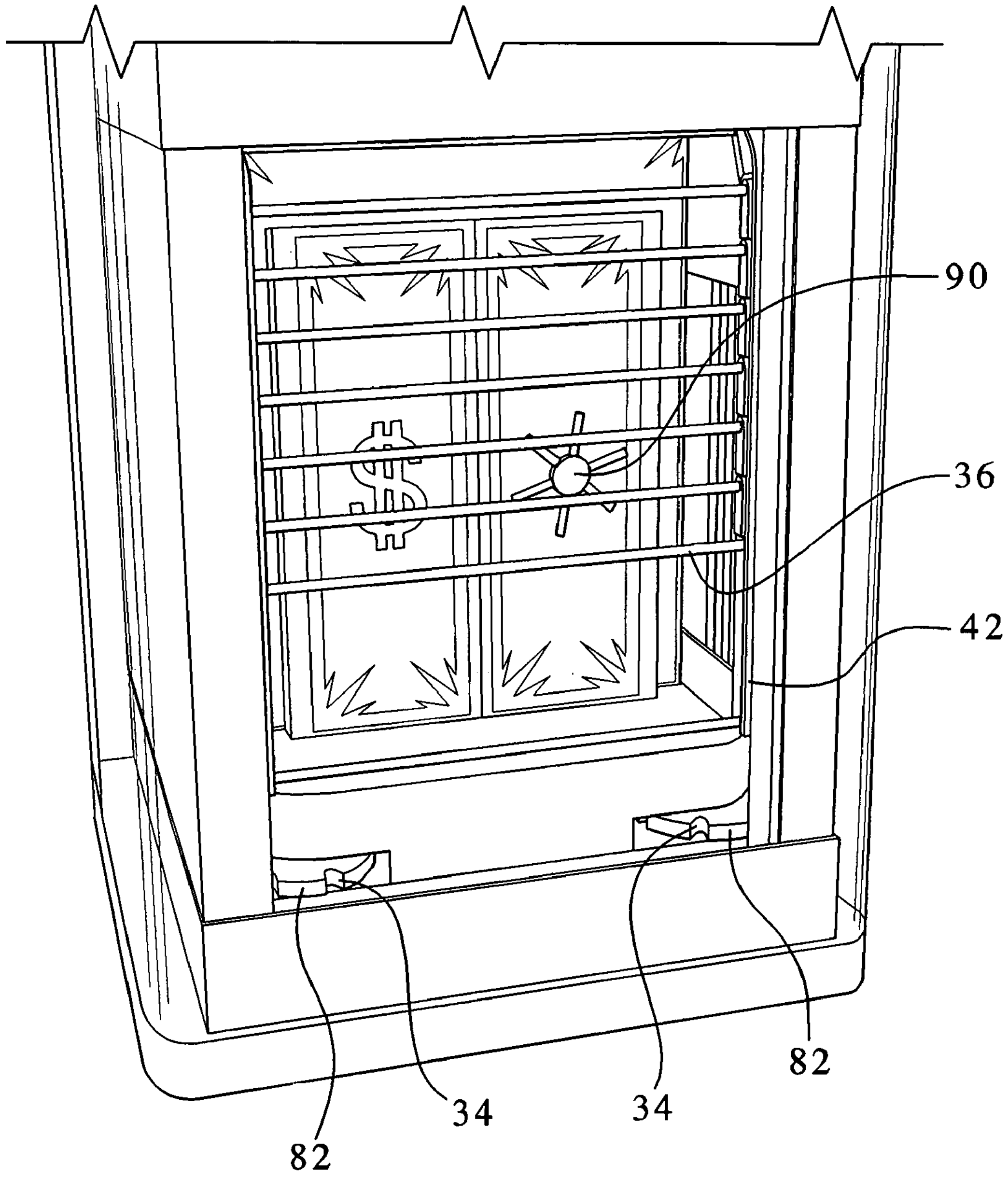
FIG. 12 is a front perspective view of one embodiment of the slot machine of the present invention with the inner gate in a partially raised position.
Figure 13:
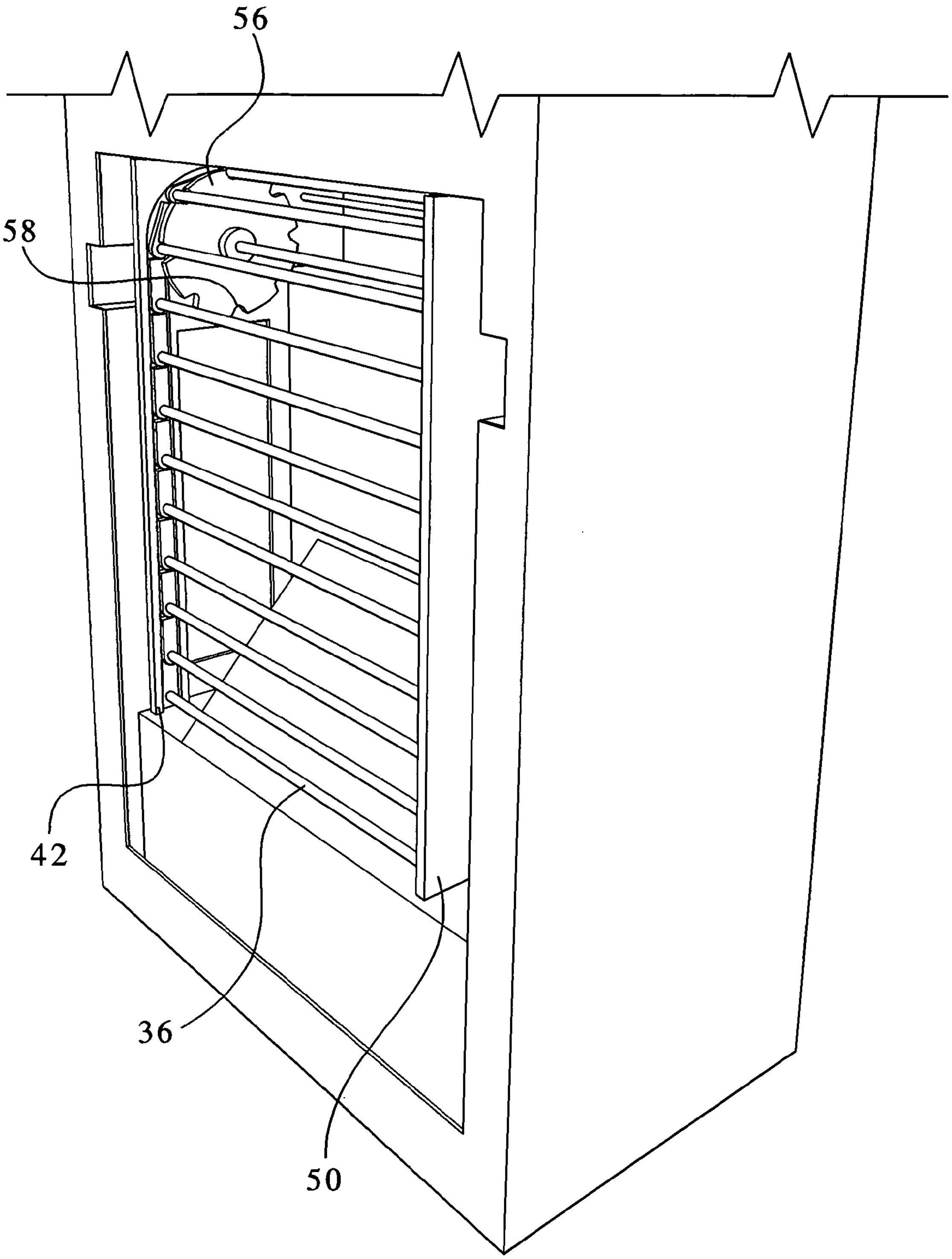
FIG. 13 is a rear perspective view of one embodiment of the slot machine showing the inner gate in the withdrawn or open position.

As described above, by moving the sliding members 40,48 along the recesses in the side tracks 42 and 50, the inner gate 36 may be moved between a closed or extended position and an open or retracted position through mechanical operations. The inner gate 36 is shown in a partially extended position in FIG. 12. As shown in FIG. 13, which is a rear view of the housing with the back removed, the inner gate 36 is hidden behind the vault when the inner gate is in the retracted or open position. The inner gate 36 is shown in the closed or extended position in FIGS. 7A, B and C.

Figure 10:
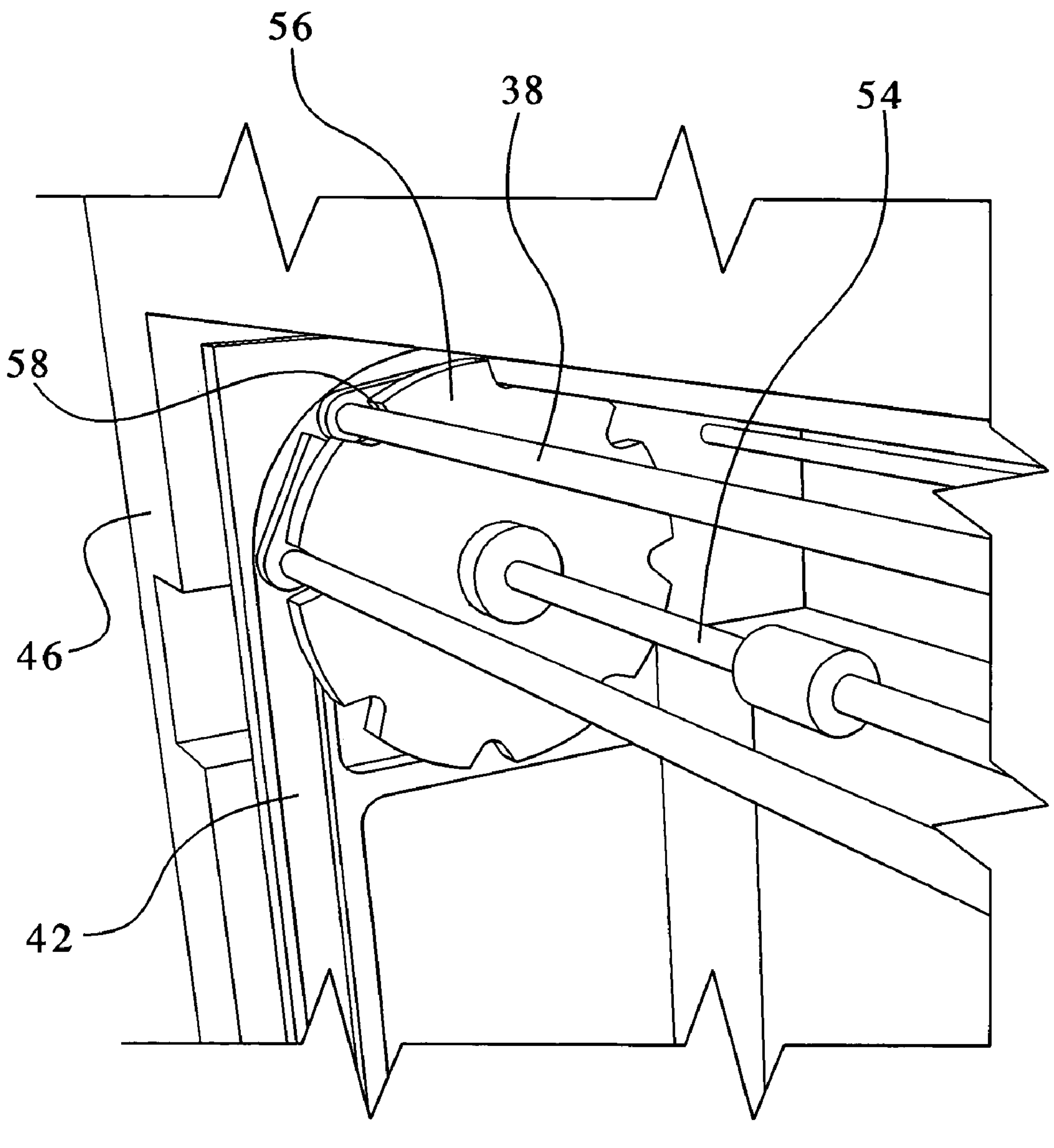
FIG. 10 is a partial perspective view of the rear of the vault mechanical assembly of FIG. 3 showing a cog gear for engaging the horizontal rods to move the inner gate between an open and a closed position.
Figure 11:
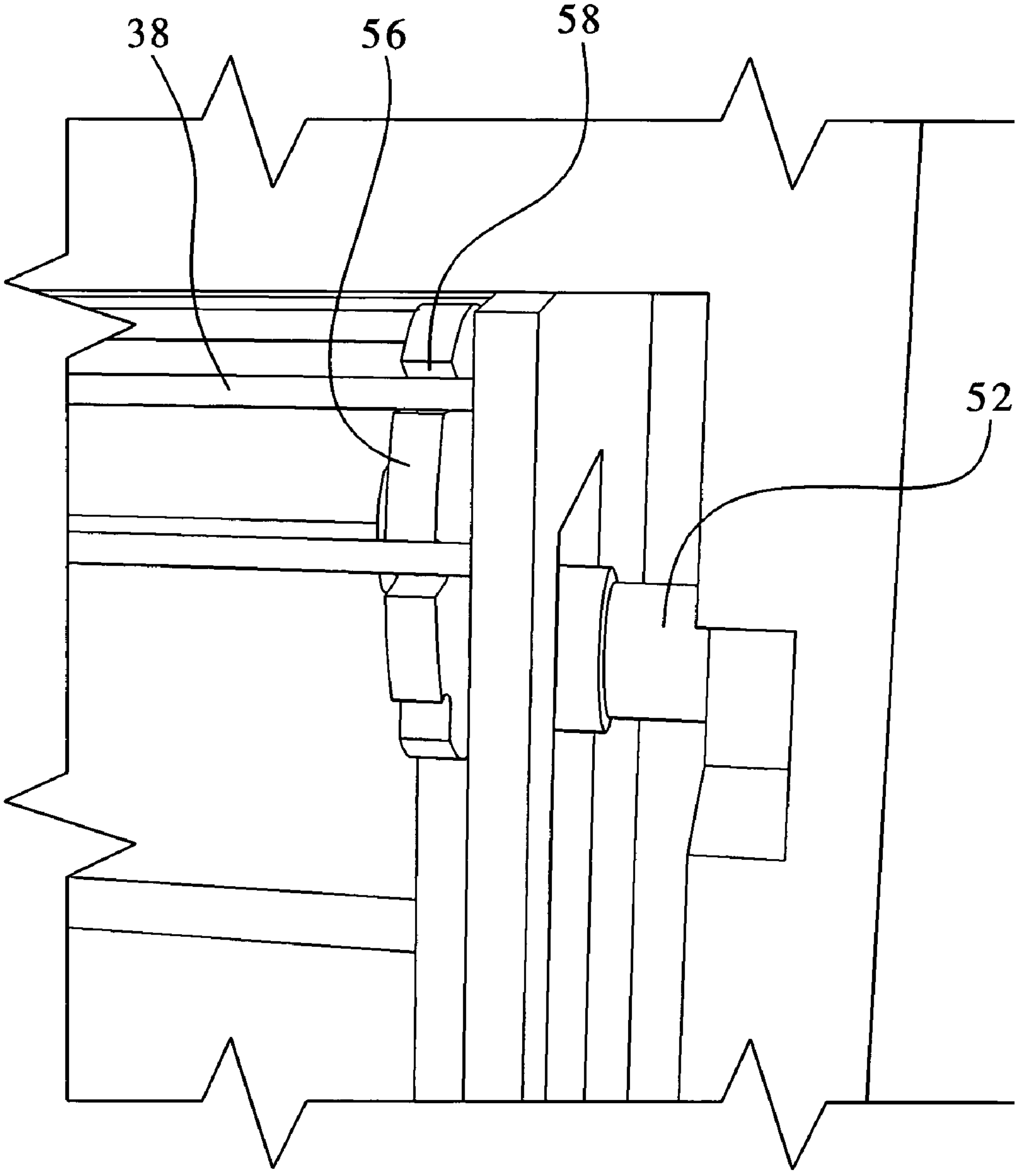
FIG. 11 is a partial rear elevational view of the vault mechanical assembly of FIG. 3.

Referring to FIGS. 10, 11 and 13, which show the rear side of the housing, means for opening and closing the inner gate 36 is provided. Preferably, the means for opening and closing the inner gate 36 is an inner gate motor subassembly operably associated with the inner gate 36 and which moves the inner gate 36 from the retracted or open position to the closed position, and vise-versa.

The inner gate motor subassembly includes a selectively actuatable electrical motor 52 in electrical communication with and controlled by the slot machine assembly 62. The motor 52 is fixedly attached to the vault mechanical assembly 14. The electric power supply 72 (discussed hereinbelow) provides electrical power to the motor 52. The motor includes a rotatable drive shaft (not shown) fixedly attached to a horizontal spindle rod 54.

Guide rollers 70 are preferably located in the front upper corners of tracks 50 and 42 to help guide the inner gate 36 at it moved between an open and a closed position. A vertical cog gear 56 is fixedly attached to each opposing end of the spindle rod 54. In the preferred embodiment, the cog gears 56 are located at the top of the assembly near the upper tracks 42 and 50. A plurality of notches 58 disposed along the periphery of each cog gear 56 matingly engage the rods 38 in successive fashion as the cog gear 56 rotates. In particular, when the motor is actuated, the drive shaft rotates, thus causing both cog gears 56 to rotate. As each cog gear 56 rotates, the notches 58 successively engage and drive a corresponding rod 38, causing the sliding members 40,48 of the inner gate 36 to slide within the tracks 42, 50. Depending on which direction the cog gears 56 are rotated, the inner gate 36 will be either extended or retracted. When viewed as in FIGS. 12 and 13, the inner gate 36 will be extended (or lowered) when cog gear 56 is rotated in a clockwise direction and retracted (or raised) when cog gear 56 is rotated in a counterclockwise manner. It is appreciated that alternate means for opening and closing the inner gate 36 may be employed, such as a pulley subassembly or the like.

Figure 14:
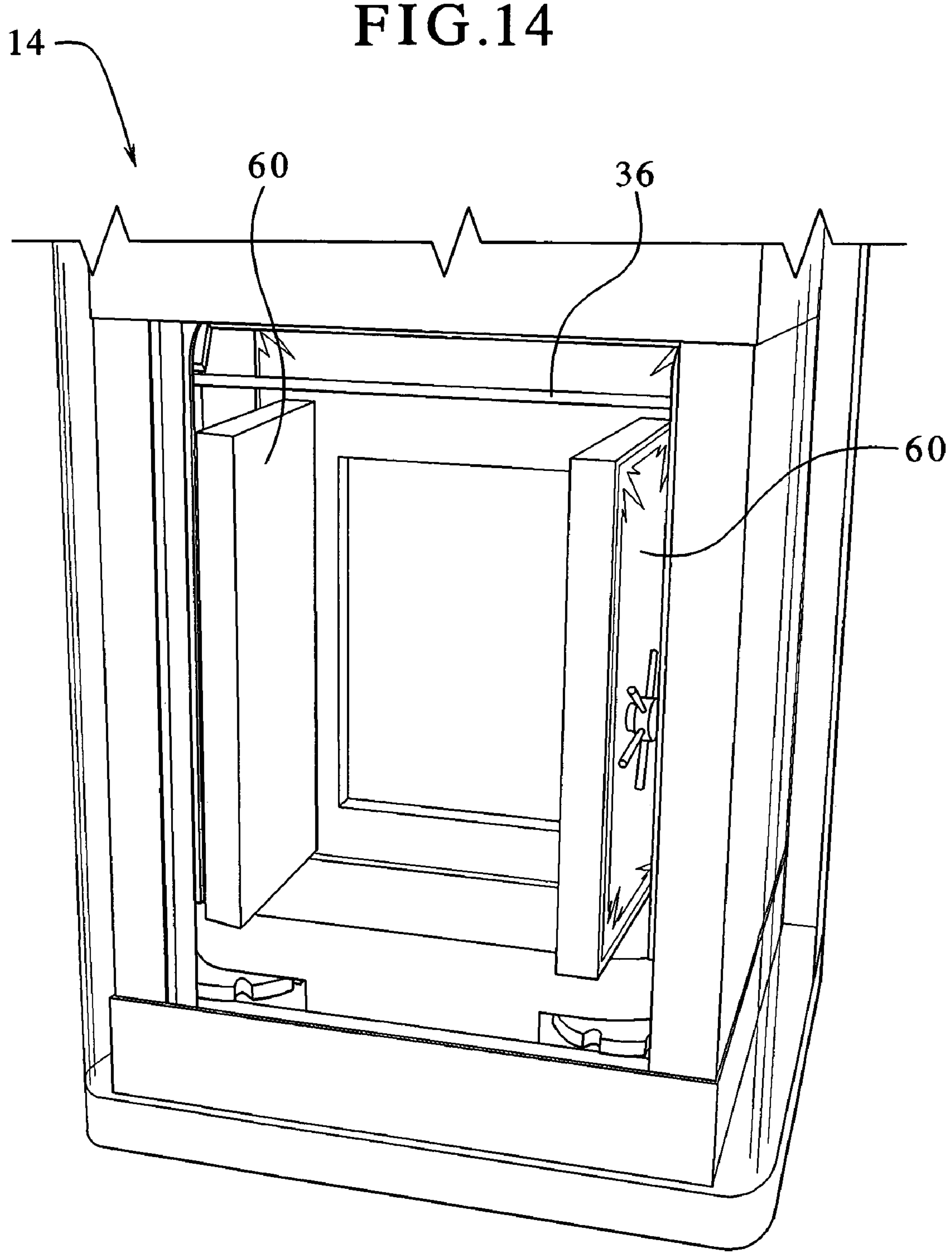
FIG. 14 a perspective view of the front of the vault mechanical assembly of FIG. 3 showing the outer gates, the inner gates and the doors in an open position.

In one embodiment, the inner closure includes one or more doors 60 that simulate bank vault doors and are pivotally attached to the vault assembly 14 by a hinge (not shown). It is appreciated that the inner closure may comprise other types of closures including, but not limited to gates or slidable doors. The one or more doors 60 are adapted to pivot between a closed position (as shown in FIG. 8) and an open position (as shown in FIG. 14). While the doors may be opened in a number of ways, it is preferred that the means for opening and closing the doors 60 includes a door motor subassembly operably associated with the doors 60. The door motor subassembly preferably includes a selectively actuatable electrical motor (not shown) that is attached to the vault mechanical assembly 14 and is in electrical communication with and controlled by the slot machine assembly 62. The motor is fixedly attached to the vault mechanical assembly 14. It is appreciated that the motor can be any number of different motors including, but not limited to a DC motor or a step motor. Electrical power for the motor is preferably supplied by the battery 74 or external power supply 72, although it is appreciated that it may be supplied by separate batteries or other power sources.

The motor includes a rotatable drive shaft (not shown) fixedly attached to the hinge. When the motor is actuated, the drive shaft rotates causing the hinge to rotate and pivotally open the one or more doors 60. Alternate embodiments are contemplated wherein a gear assembly (not shown) or a cam assembly (not shown) is interposed between the motor and the hinge. Also shown is simulated vault handle 90 that can be made to rotate or spin, when the vault doors are opened. FIG. 14 shows vault doors 60 in the opened position so as to reveal the video screen contained therein.

Referring to FIGS. 15 through 37, a series of screen shots depicting the various levels of play are shown. In the preferred embodiment, the screen shots would be displayed on the video screen display 68. With respect to FIG. 15, a conventional mechanical slot machine display or the computer generated simulation of a slot machine having any number of slots, lines and wheels can be provided.

Figure 15:
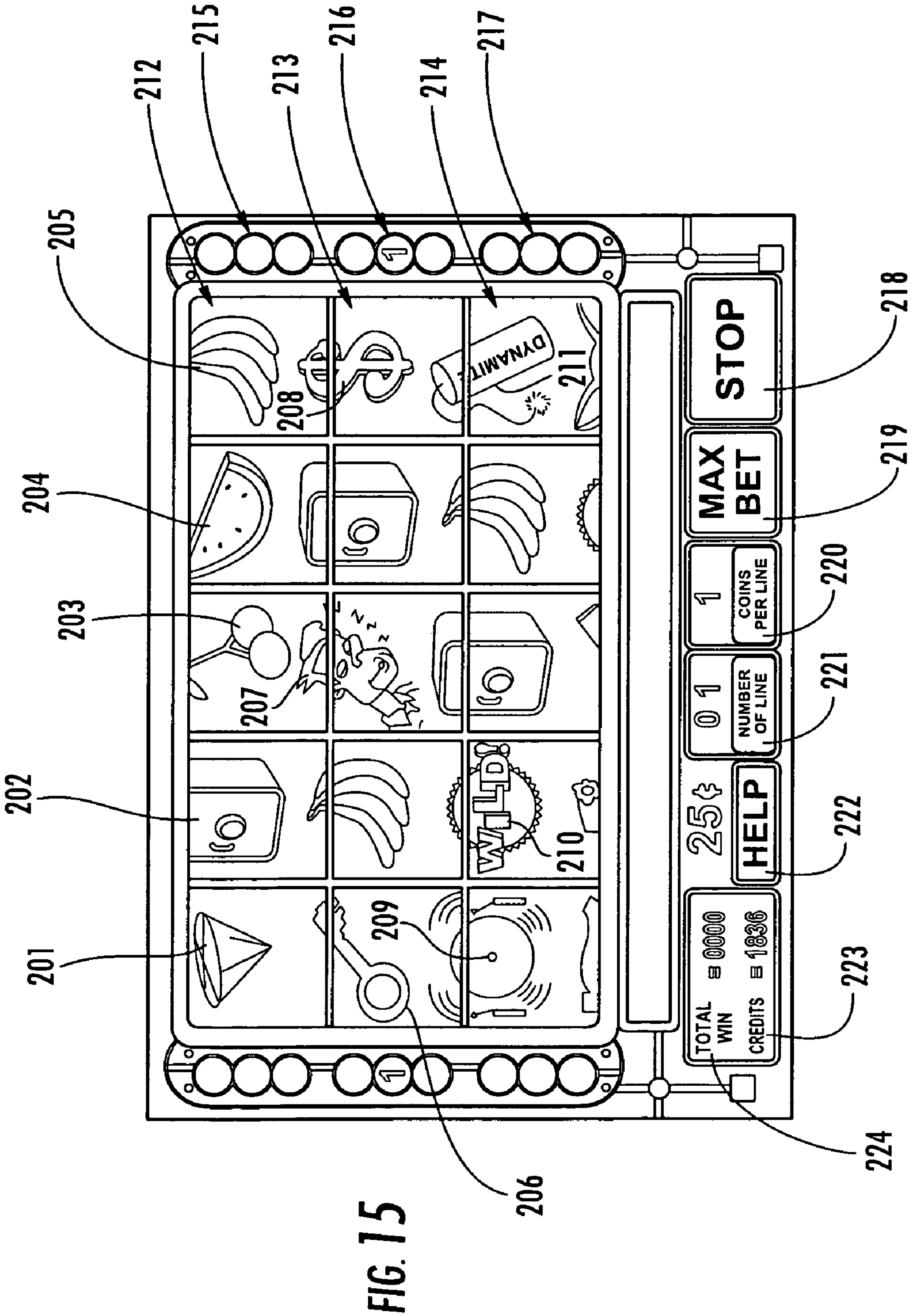
FIG. 15 is an illustration of one embodiment of a screen shot of the initial slot machine screen.

In the present example, three horizontal rows 212–214 of five symbols are illustrated in FIG. 15. Various different symbols may be used on the reels including, but not limited to, diamonds 201, safes 202, cherries 203, melons 204, bananas 205, keys 206, men 207, dollar signs 208, ringing bells 209, wilds 210 and dynamite sticks 211.

Information concerning the status of the game and the player's participation in the game may be displayed on the screen in a number of display areas. Display areas may include, but are not limited to, information such as the total amount won 224, available credits 223, number of lines selected for play 221 and coins wagered per line 220. During play of the game, these display areas are preferably automatically updated after each round and as a result of information inputted by the player through the selection or input device. Additional buttons or displays may include a help button 222, a maximum bet button 219 and a stop button 218 for stopping a spin of the slot wheels prior to when it would automatically stop. These buttons and displays can be mechanical provided or instead provided on a computer displayed touch screen.

Activation of the reels will spin the reels in a manner known in the art to produce a randomly generated outcome. It is appreciated that the frequency in which certain symbols or combination of symbols may occur may be adjusted to decrease or increase the odds of winning.

Figure 16:
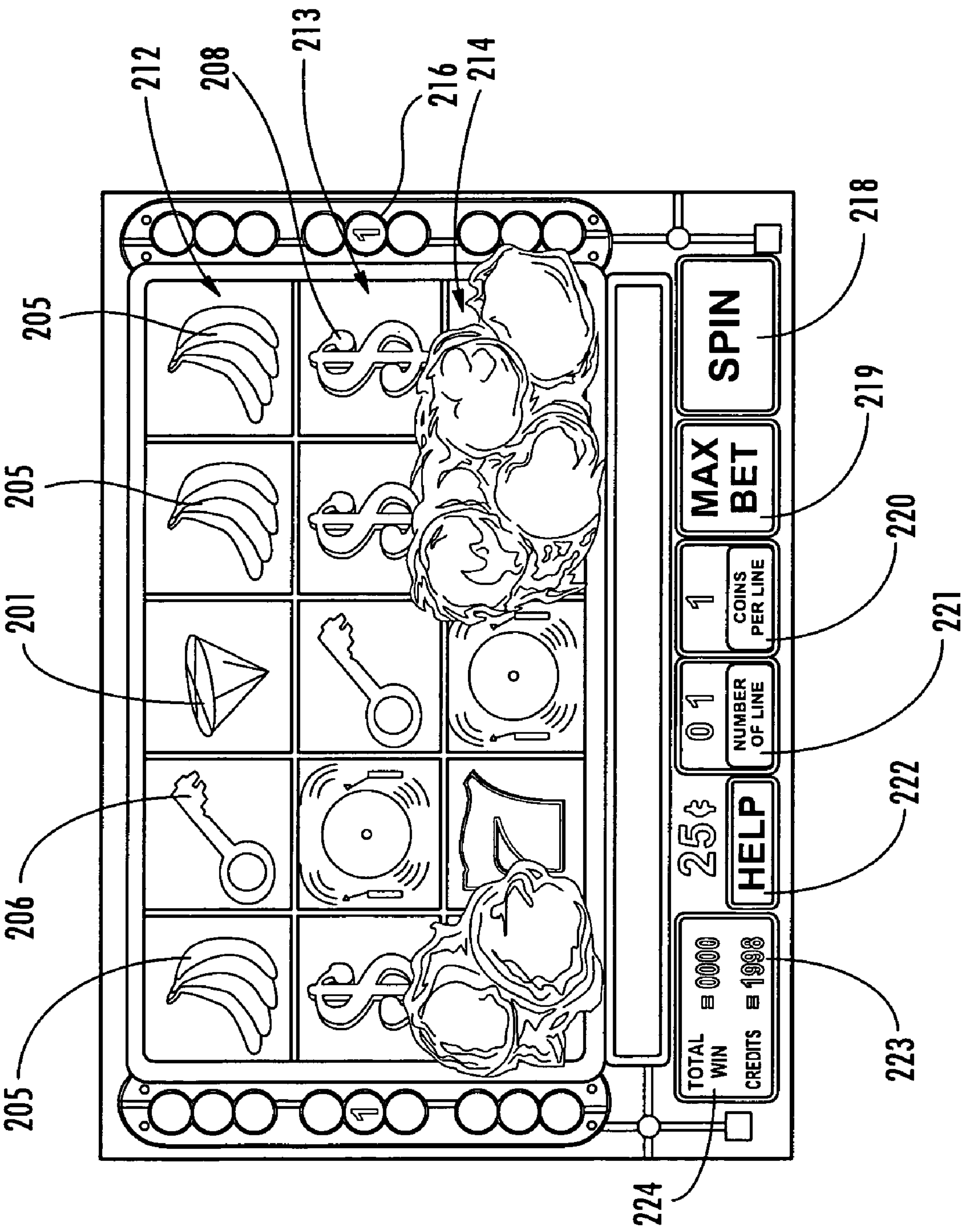
FIG. 16 is an illustration of one embodiment of a screen shot of the slot machine portion of play showing a simulated explosion indicating a winning result.

Line indicators 215–217 are also provided alongside each line 212–214. Referring again to FIG. 15, the line indicator 216 shows that the middle line 213 has been selected. Turning to FIG. 16, because the spin produced "three of a kind" signified by three pre-selected symbols 208 in the selected line 213 (as shown by line indicator 216), an explosion is simulated, as shown on line 214. The outer gate 18 of FIG. 3 is then opened and removed as an obstacle to accessing the bank vault door 60.

Figure 17:
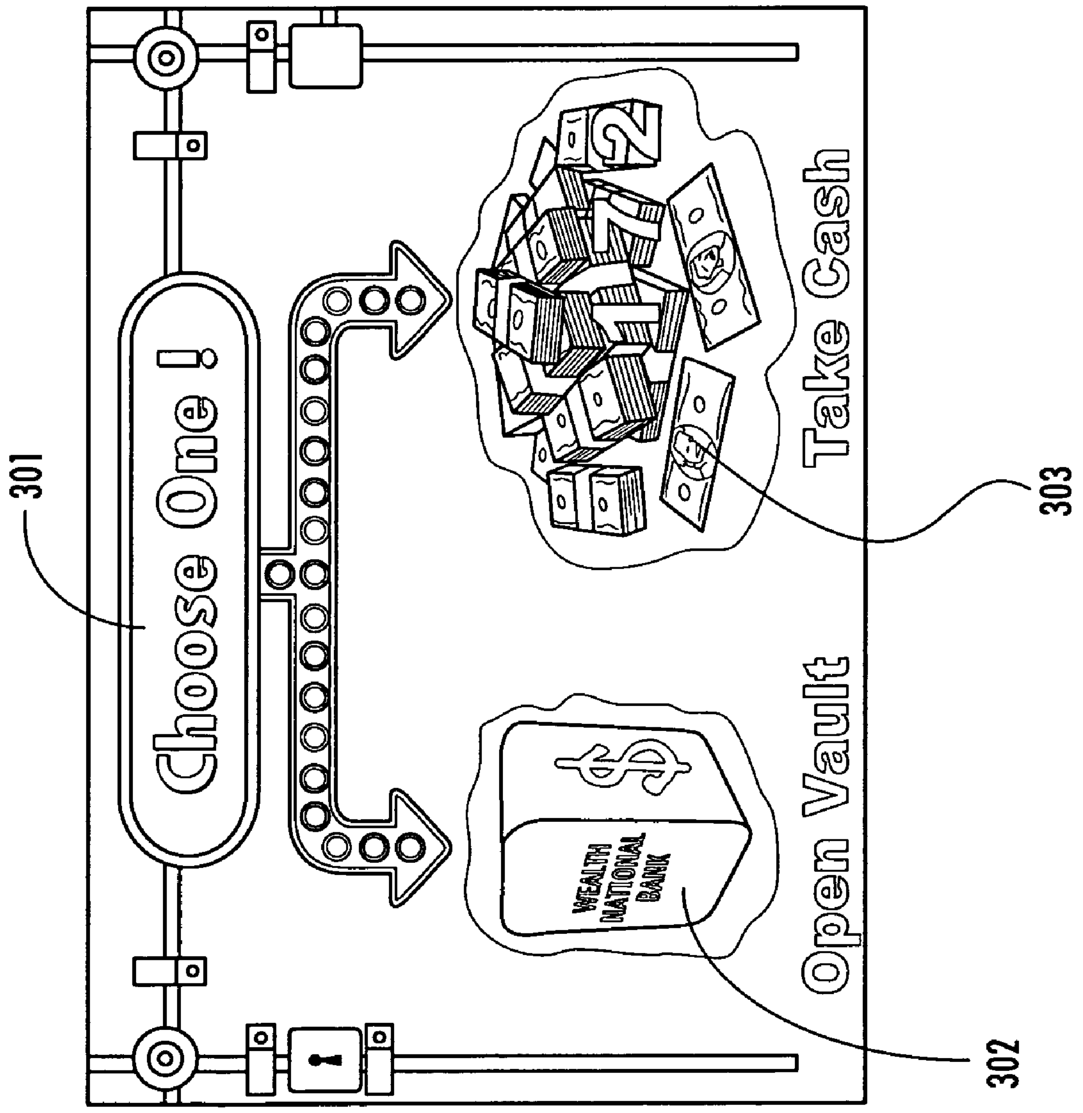
FIG. 17 is an illustration of embodiment of a screen shot illustrating a choice for the player to choose between trying to open the vault and cashing out.
Figure 18:
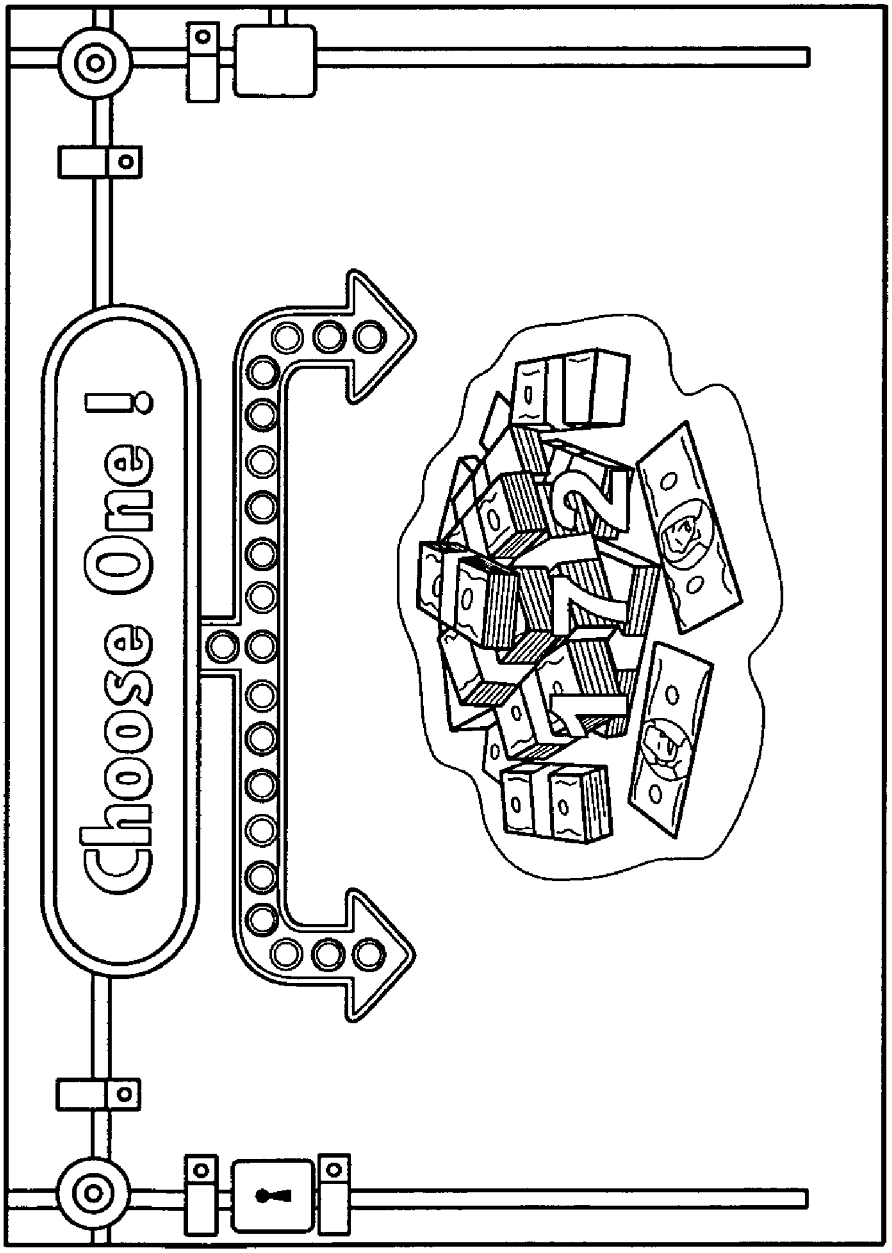
FIG. 18 is an illustration of one embodiment of a screen shot showing that the player has chosen the "cash out" option from FIG. 17.

As shown in the screen shot of FIG. 17, after opening the outer gate 18, the player is then prompted by a display message 301 to continue attempting to open the vault or to "take cash" represented by the points accumulated so far during play. The options may be selected in a manner known in the art including, but not limited to, pushing a button or touching an area 302,303 on a touch screen. FIG. 18 shows a screen shot after the player has chosen to "cash in" and receive "172" points rather than continue playing to try to open the bank vault.

Figure 19:
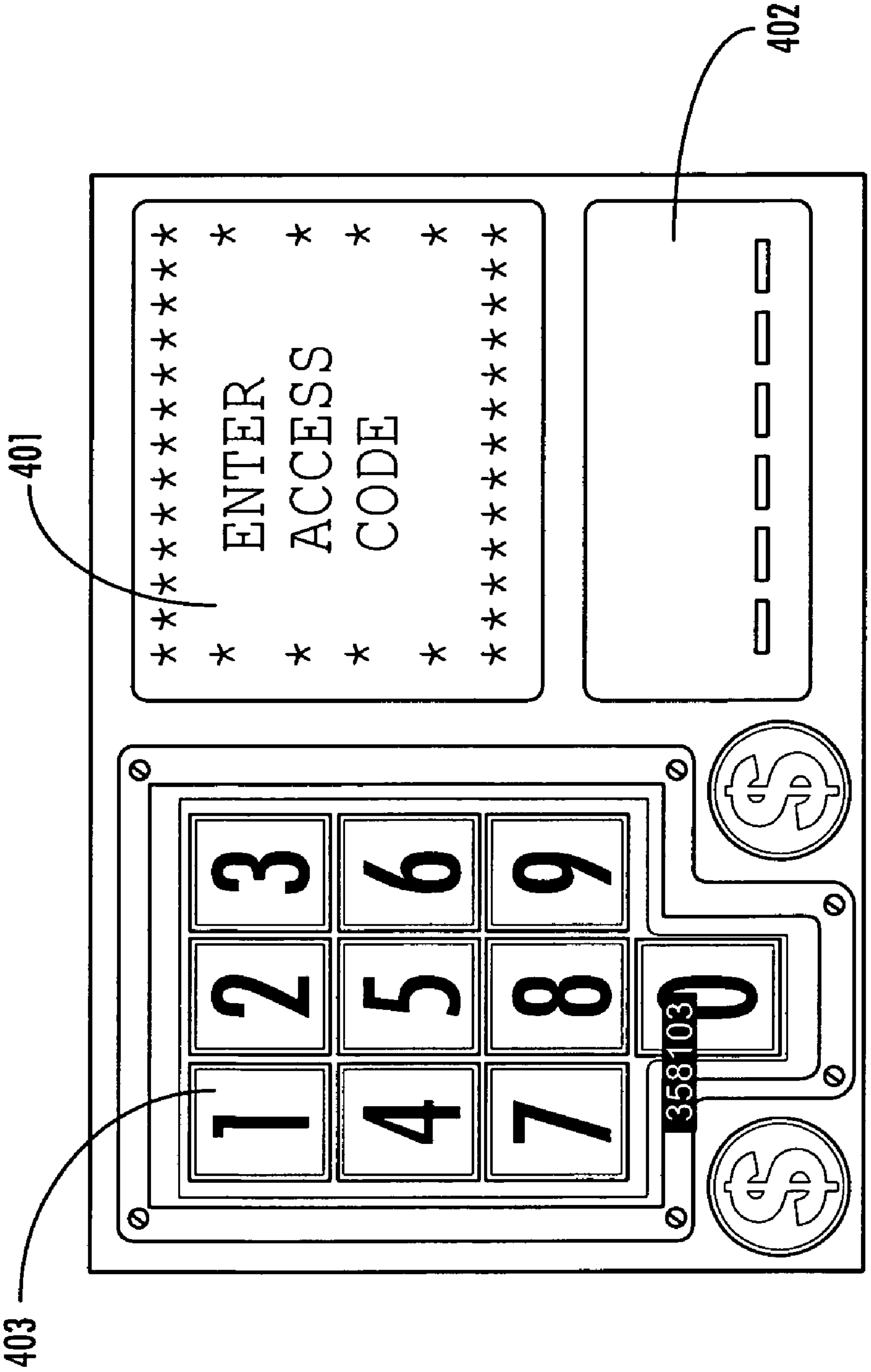
FIG. 19 is an illustration of one embodiment of a screen shot of the alarm system portion of play.

Should the player decide to continue to try to open the bank vault, the next stage or level of play is to open the inner gate 36, as shown in FIG. 4. To do this the player must figure out the correct security access code needed to defeat the simulated burglar alarm. The screen shot of FIG. 19 shows an information display area 401, a code display area 402 and a simulated keypad 403. Certain of the access code numbers may be initially revealed to the player or the player may be required to guess all six numbers of the code. It is appreciated that the alarm code may comprise any number of numbers, letters, symbols, or a combination thereof and not depart from the scope of the present invention.

Figure 20:
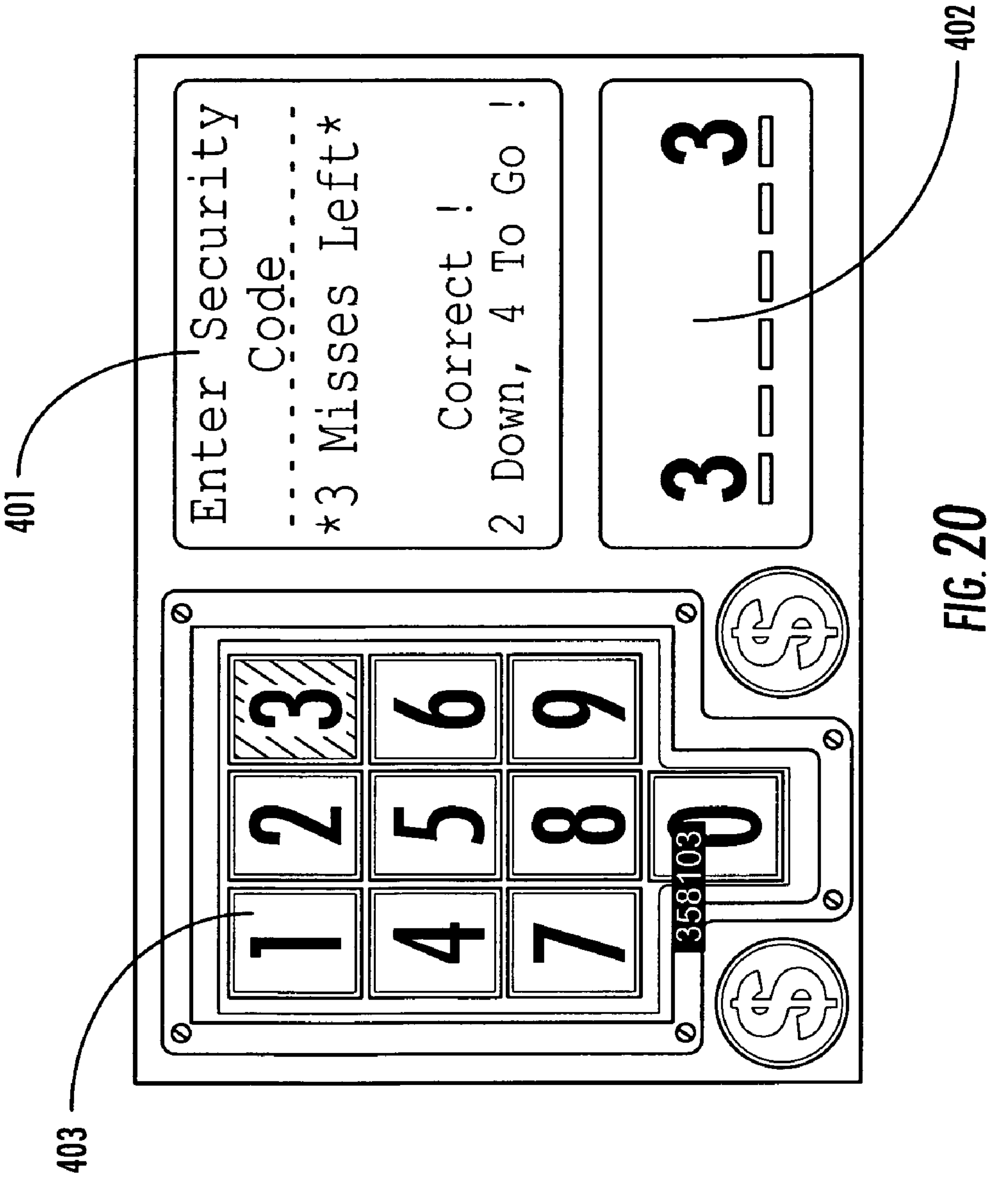
FIG. 20 is an illustration of one embodiment of a screen shot of the alarm system portion of play illustrating that the player has identified two correct numbers out of six, and has three chances left to enter the full security access code.

As shown in FIG. 20, selecting number "3" from keypad 403 reveals two of the six code numbers needed as displayed in code display area 402, with "4 to go", as stated in information display area 401. In this embodiment, the player is given three "misses" or wrong choices to get all six numbers right. While the embodiment shown and disclosed allows for three misses, it is appreciated that the player may be given any number of chances to correctly identify the access code. In order to assist the player in guessing the correct code, as a number is selected from the keypad 403, the numbers on the keypad may thereafter be shown as darkened to prevent the player from picking the same number twice.

Figure 21:
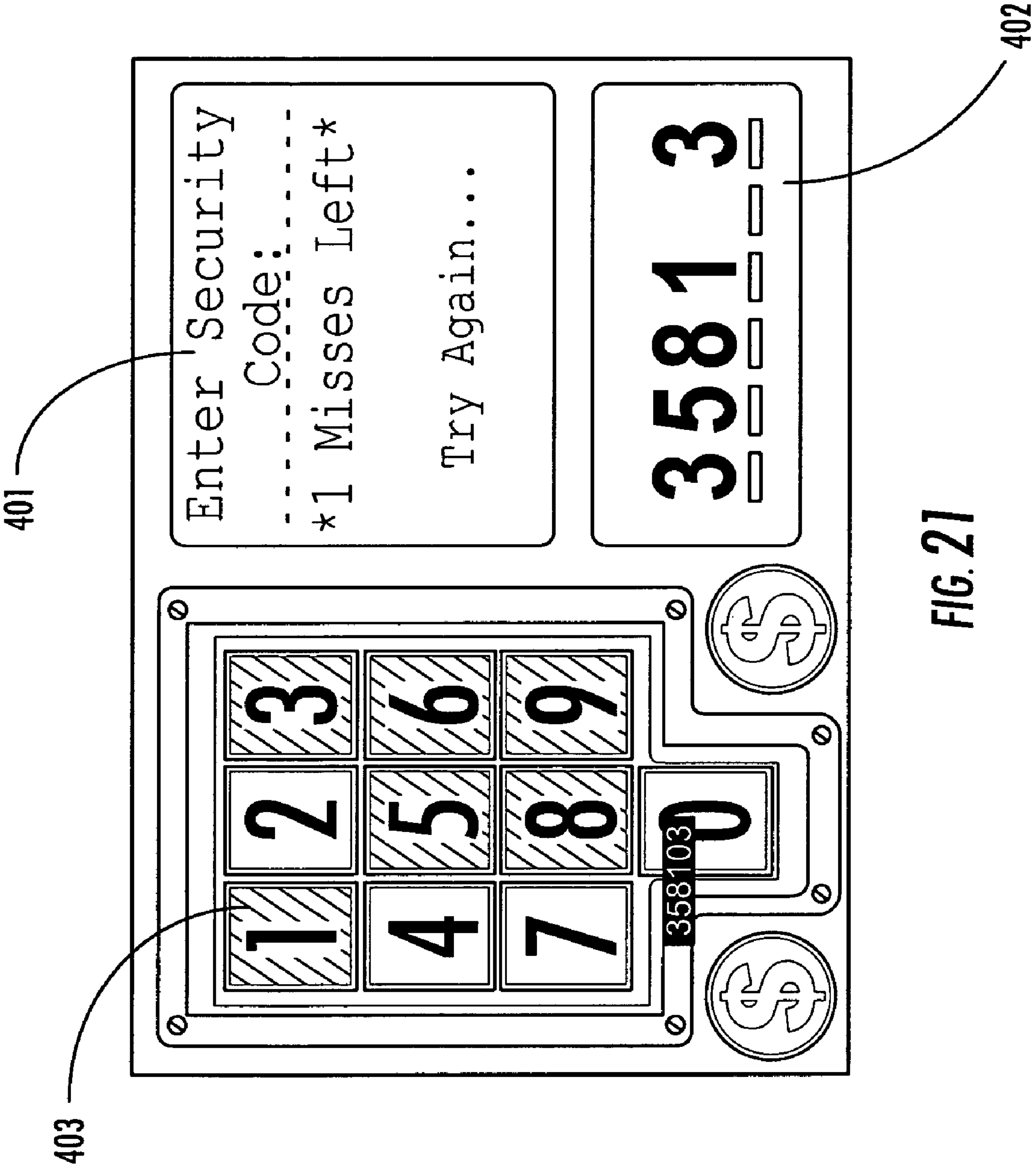
FIG. 21 is an illustration of one embodiment of a screen shot of the alarm system portion of play showing that the player has identified five of the six number of the security access code, and only has one chance left.
Figure 22:
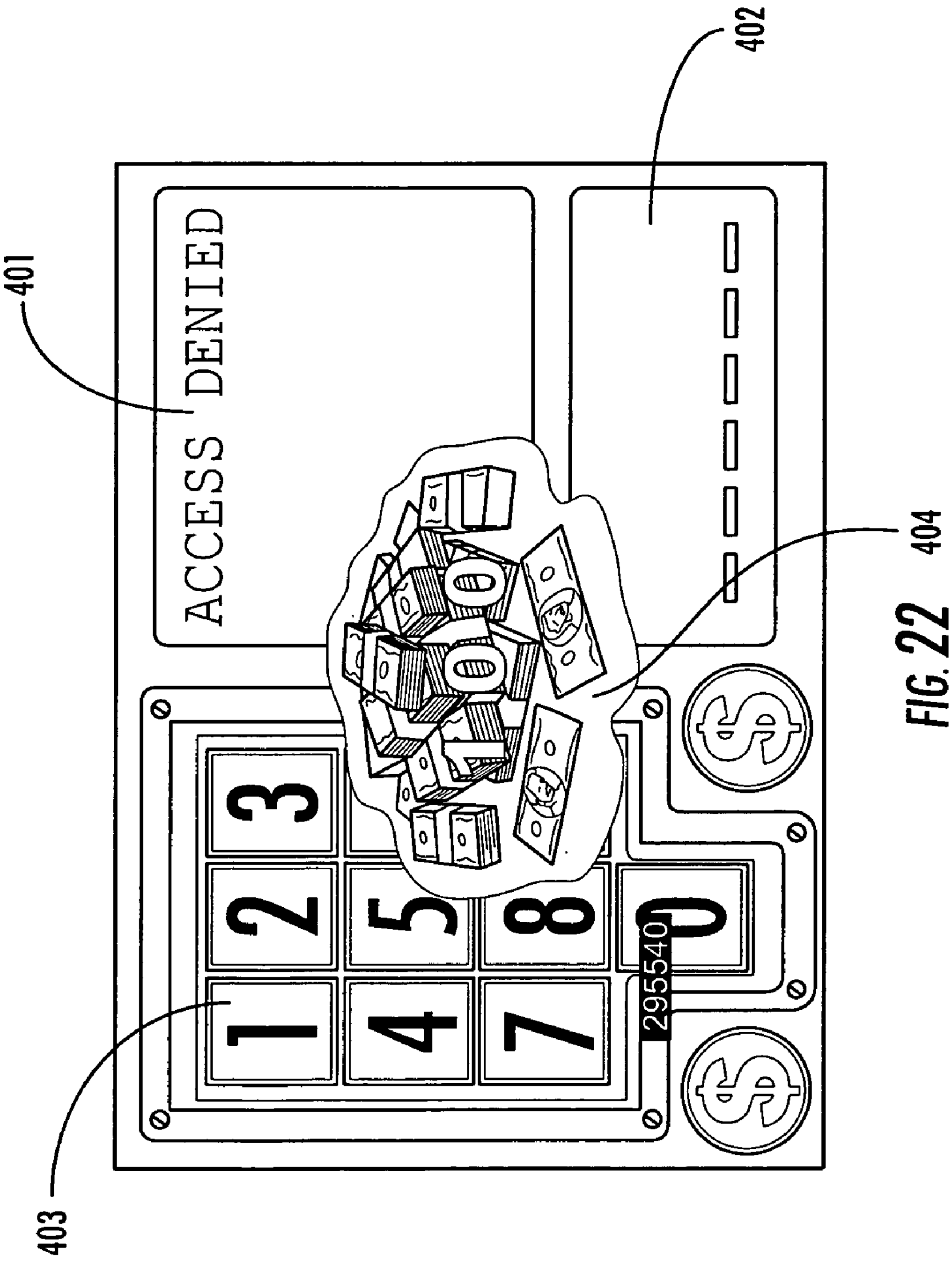
FIG. 22 is an illustration of one embodiment of a screen shot of the alarm system portion of play illustrating that the player has failed to identify the security access code and access to the bank vault has been denied.

As shown in FIG. 21, the numbers "5", "8" and "1" were correctly selected as part of the code shown in display area 402. Because the selected numbers "6" and "9" were wrong, the player is left with only one more allowable "miss" or wrong number. In this example, because the remaining number of "0" was not correctly selected before a third wrong number was selected, FIG. 22 shows an "ACCESS DENIED" message in display area 401 and a consolation prize of "100" points. Further play in this particular game is thereby ended, wherein the player then has the option of playing again. Alternatively, the player could be allowed to continue with a penalty assessed.

Figure 23:
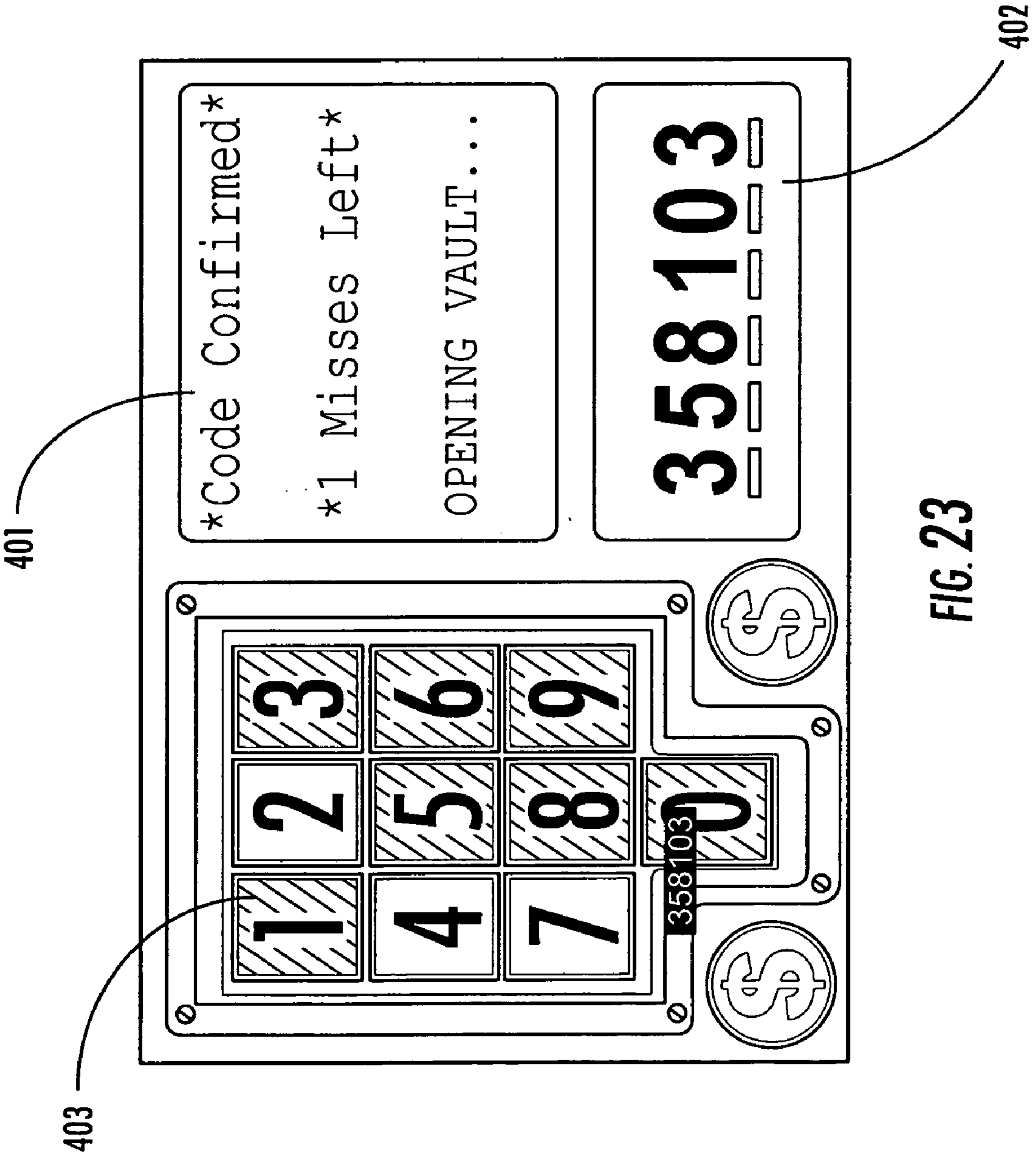
FIG. 23 is an illustration of one embodiment of a screen shot of the alarm system portion of play showing that the player has identified all six of the numbers for the security access code and the vault is opening.
Figure 24:
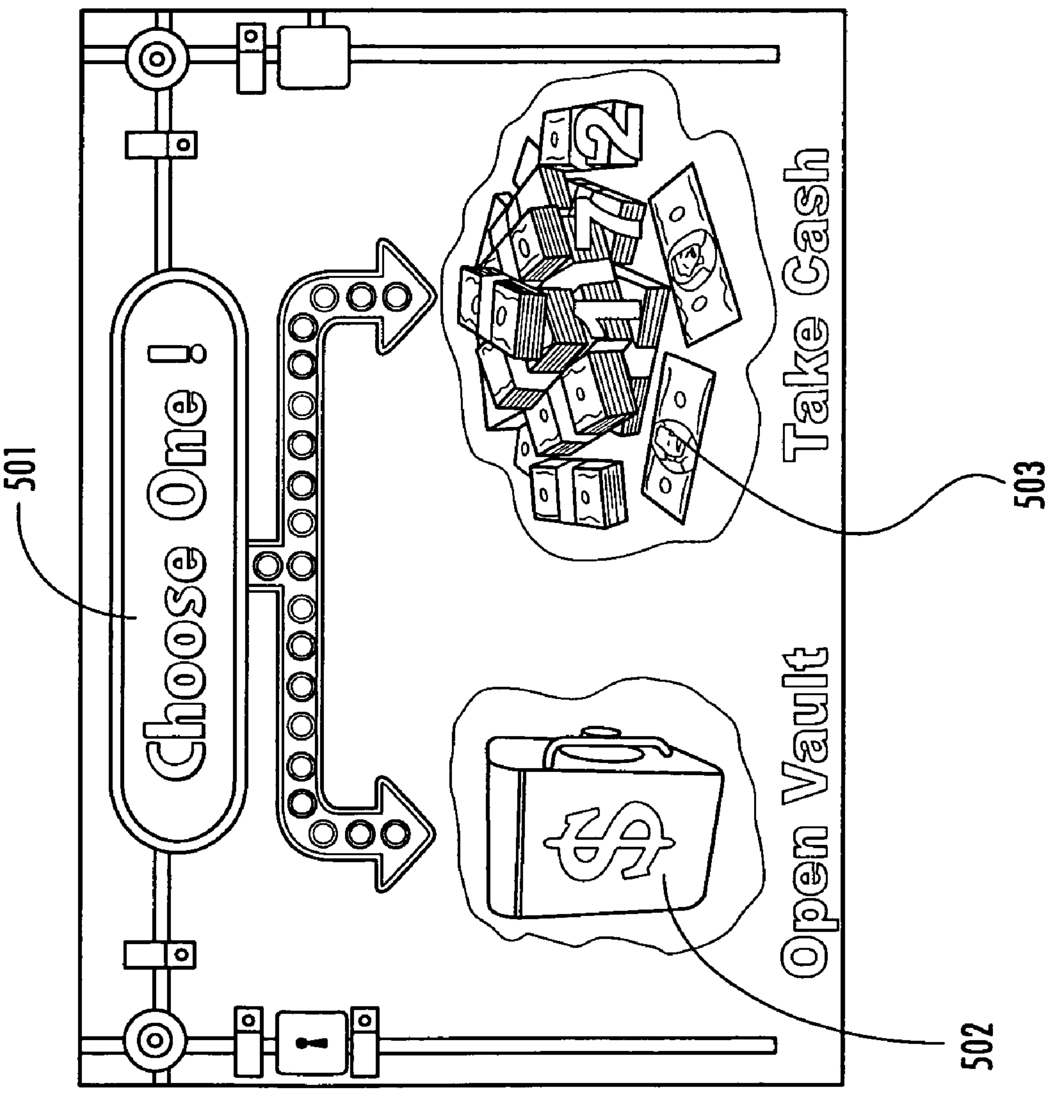
FIG. 24 is an illustration of one embodiment of a screen shot illustrating a choice for the player to choose between trying to continue to open the vault and cashing out.

If, as shown in FIG. 23, the player had correctly selected the remaining number "0" as shown in the code display area 402, the code is confirmed by a message displayed in the information display area 401 and the inner gate 36 of FIG. 4 is opened and removed as a barrier to the bank vault. As shown by the screen shot of FIG. 24, the player may then be prompted by a message 501 to choose between continuing on to "open vault" by pressing the touch screen display area 502 or to "take cash" of "172" accumulated points by pressing the touch screen display area 503. It is appreciated that a player may also select the various options using any of the various selection and input devices, including, but not limited to, a plurality of buttons.

While an access code is shown and disclosed as the second level, it is appreciated that the second level may include any type of game level associated with a bank robbery and not depart from the scope of the present invention. For example, the player may have to decide which of a series of electrical switches and/or electrical boxes must be thrown or cut to disable an alarm. Additionally, the second level may include another slot machine game whereby one of a predetermined winning outcome must be attained in order to open the inner gate.

Figure 25:
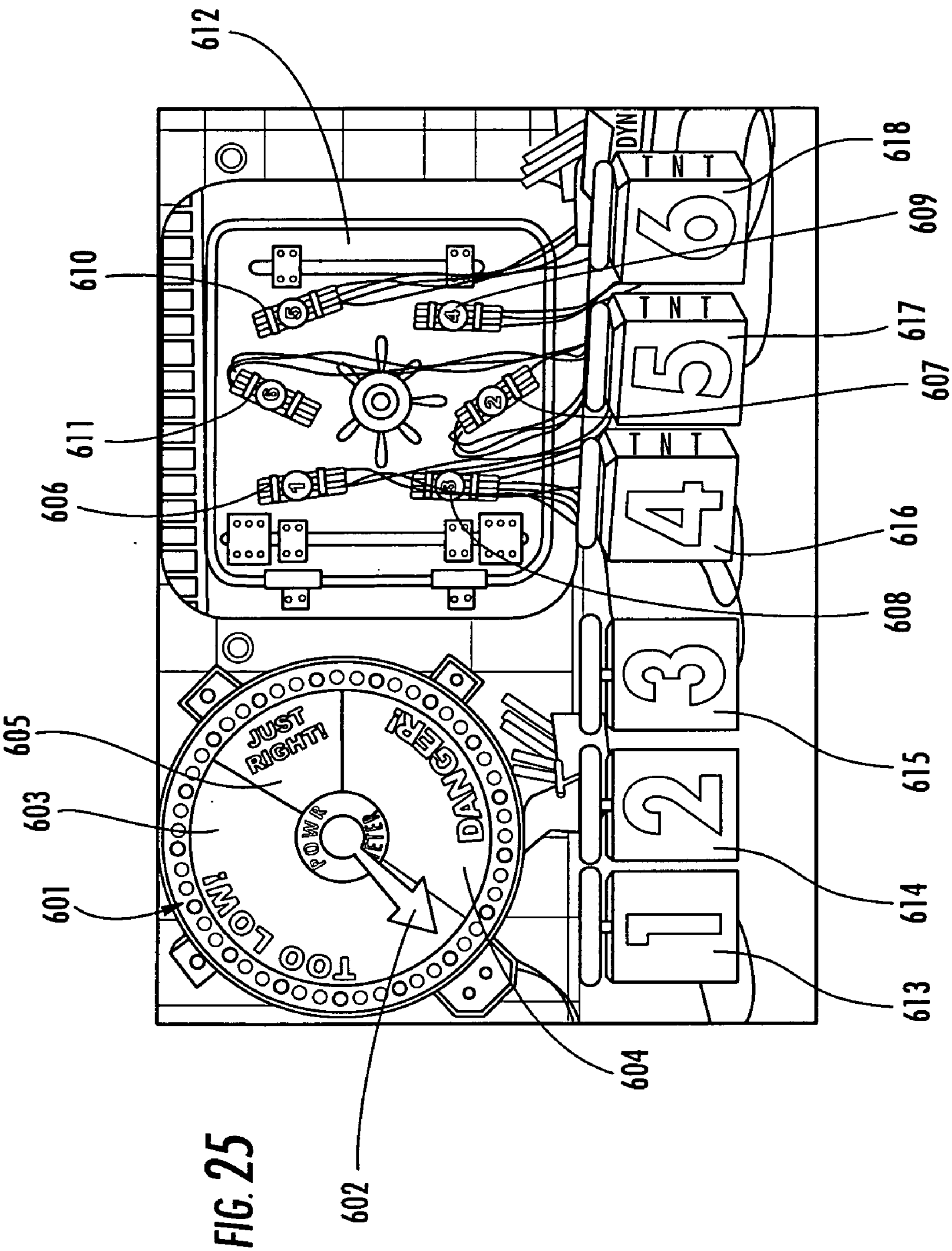
FIG. 25 is an illustration of one embodiment of a screen shot showing six simulated explosive charges on a bank vault door, six detonators and a power meter.

Once the inner and outer gates 18 and 36 are removed as barriers to the bank vault contents, the next level involves "breaking into" the bank vault. Bank vault doors 60 are shown as closed as in FIG. 13 at the beginning of this stage of the game. Referring to FIG. 25, a power meter 601 that measures the effect of the amount of simulated explosive charges 606–611 used by the player in an attempt to simulate "blowing open" the bank vault door 612 is shown. One or more of detonators 613–618 that are numbered 1–6 to correspond to the numbered explosive charges 606–611 shown on the door 612 are selected by the player to signify the amount and selection of explosive charges to be used in the attempt to open the bank vault door 612. The dial or power meter 601 is preferably divided into regions that indicate whether the selected explosive charges are the correct amount to open the vault door. Examples of regions include: a "TOO LOW" region 603 (not enough explosive selected); a "DANGER" region 604 (too much explosive selected); and a "JUST RIGHT" region 605 (correct amount or explosive selected).

Figure 26:
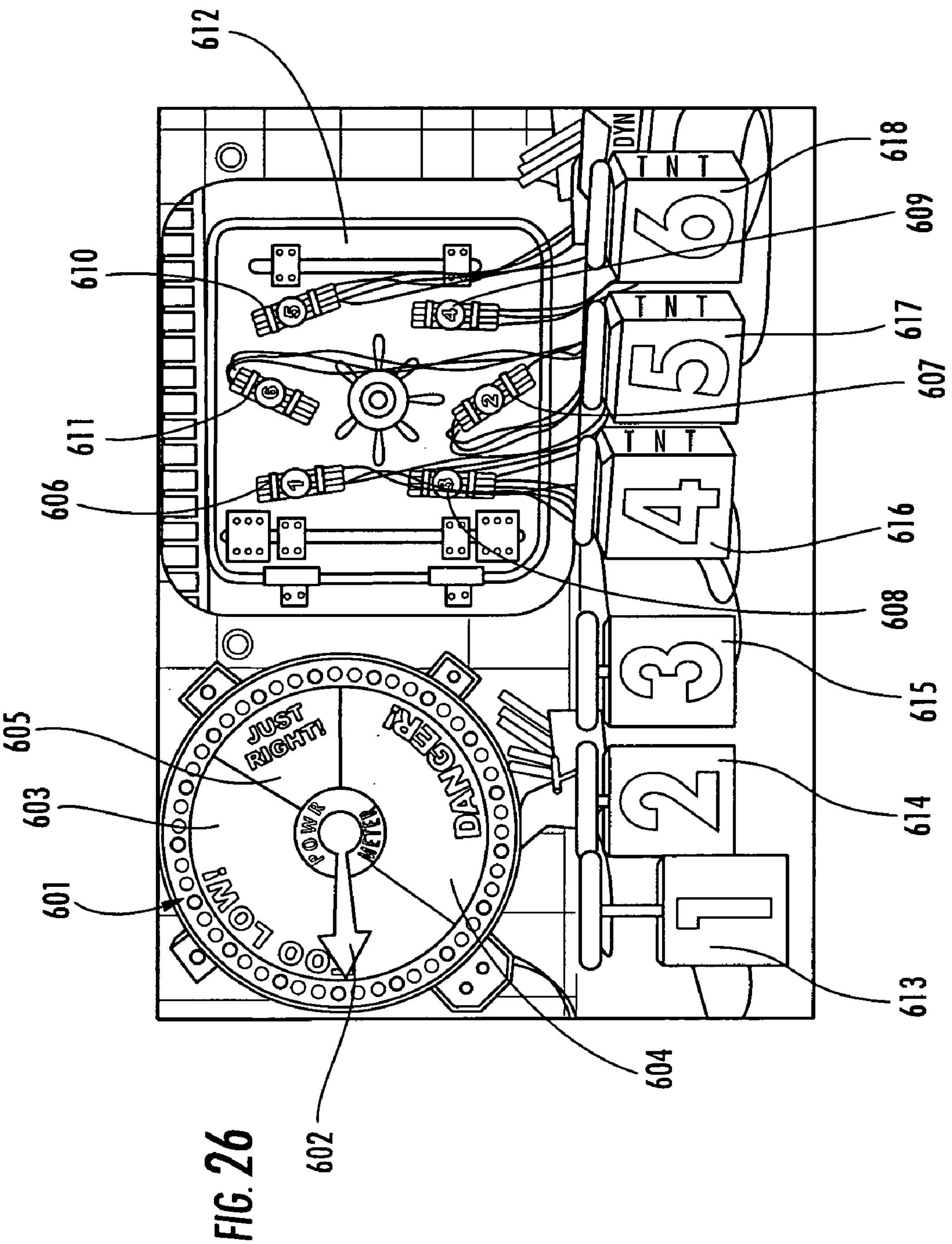
FIG. 26 is an illustration of one embodiment of a screen shot illustrating that the first detonator has been selected.
Figure 27:
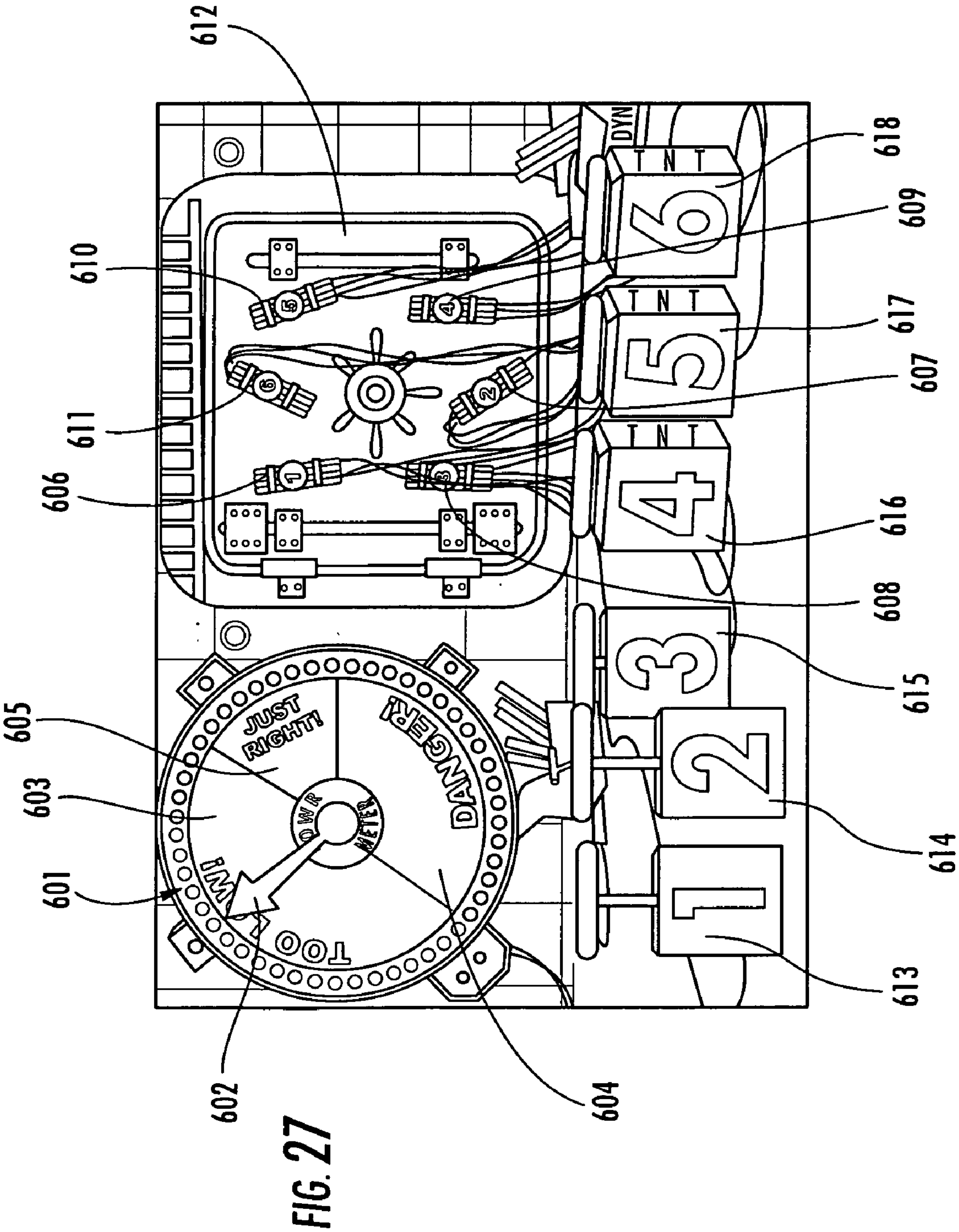
FIG. 27 is an illustration of one embodiment of a screen shot showing that the first and second detonators have been selected.
Figure 28:
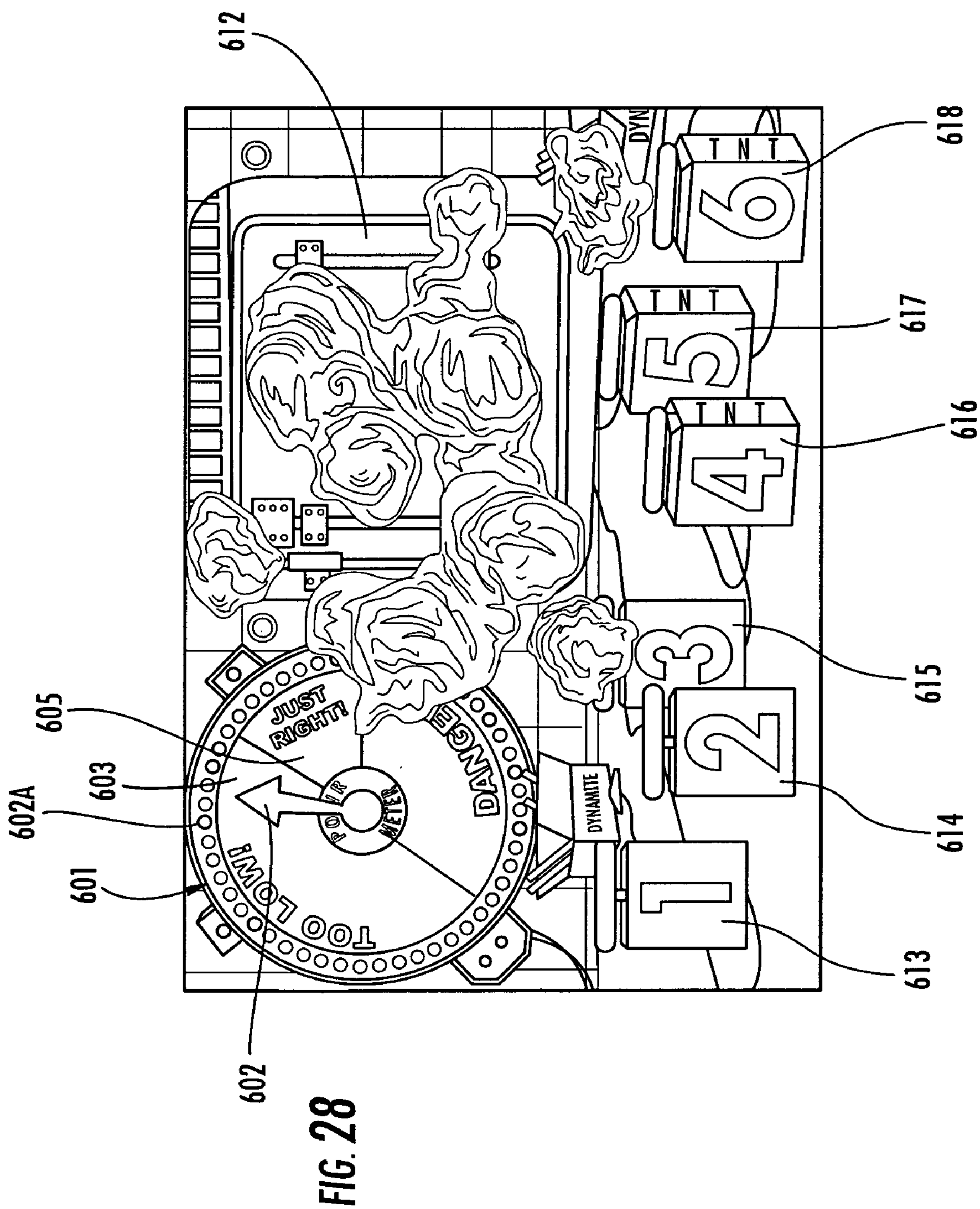
FIG. 28 is an illustration of one embodiment of a screen shot illustrating the explosive charges being detonated after the second, fourth and sixth detonators are selected.

As shown in FIGS. 26, 27 and 28, if an insufficient number of charges is selected, such as charge "1" (613) of FIG. 23; charges "1" and "2" (613 and 614) of FIG. 27; and charges "2" and "4" and "6"(614, 616 and 618) of FIG. 28, after detonation, pointer 602 reads in the "TOO LOW" range 603 of power meter 601. Lights 605 and pointer 602 may thereafter show how close the player came to "JUST RIGHT" 605. A simulated explosion 620, as shown in FIG. 28, may also be shown in front of the bank vault door 612. In the present example, the player is then shown in FIG. 29 that the power meter pointer 602 stays in the "too low" range 603; the vault door 612 is undamaged and unopened; and detonators "2" (614), "4" (616) and "6" (618) were chosen. In addition, a consolation prize of "206" points may also be credited to the player.

Figure 30:
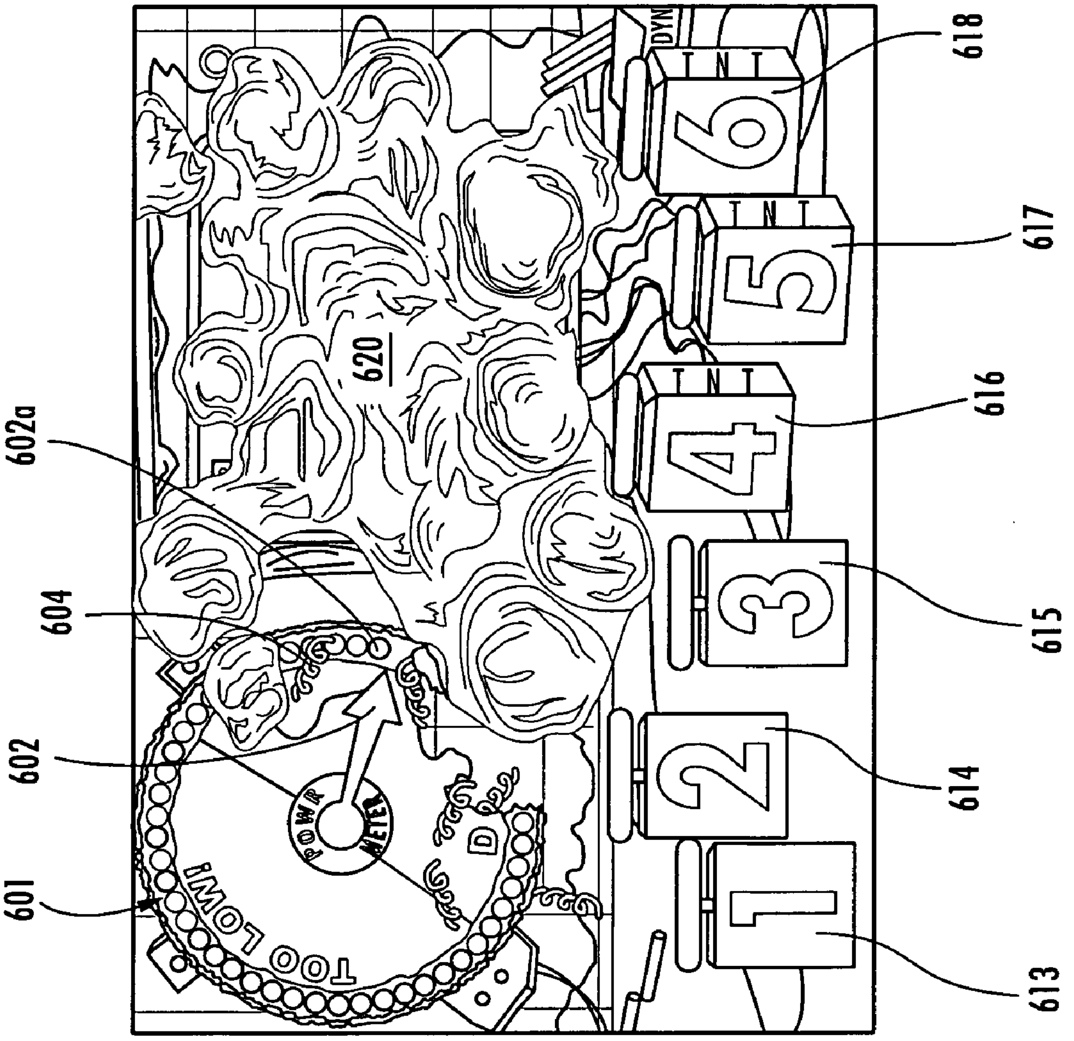
FIG. 30 is an illustration of one embodiment of a screen shot showing the first, third and fifth explosives charges being detonated.

The consequences of using too much explosive is shown in FIG. 30. Because all six charges (613–618) were selected, a large explosion 620 is simulated. The power meter 601 is shown as partially demolished by the force of the blast during the explosion and the power meter pointer 602 and lights 602A are shown in what was the "DANGER" zone area of the power meter 601.

Figure 31:
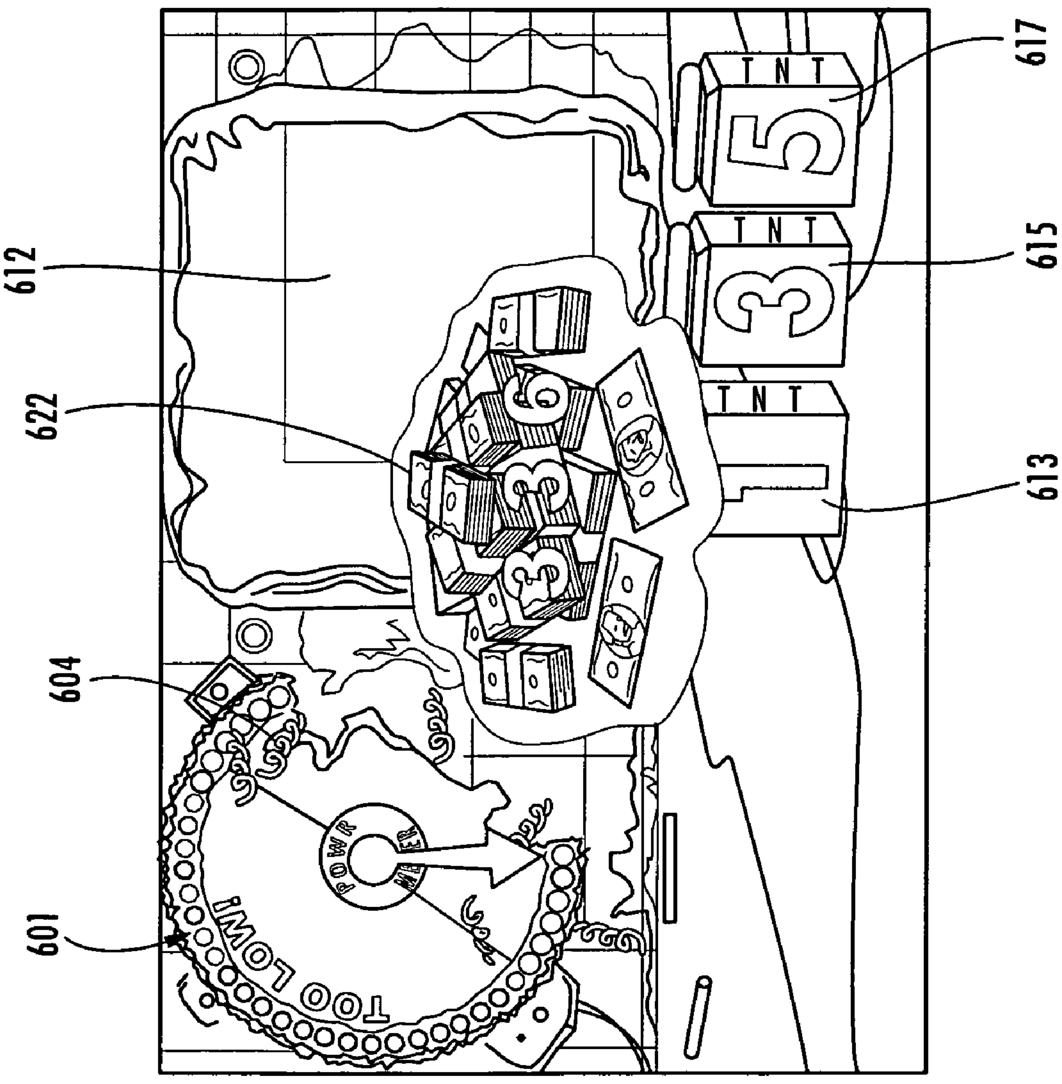
FIG. 31 is an illustration of one embodiment of a screen shot illustrating that the selected detonators from FIG. 30 was too much, that the player receives a consolation prize and the correct combination of detonators was the fourth, fifth and six detonators.

Turning to FIG. 31 (which is an embodiment of a screen shot after the explosion in FIG. 30), the vault door 612 and the power meter 601 are shown as severely damaged from explosive charges "1", "3" and "5". A consolation prize 622 of "336" points is then displayed.

Figure 32:
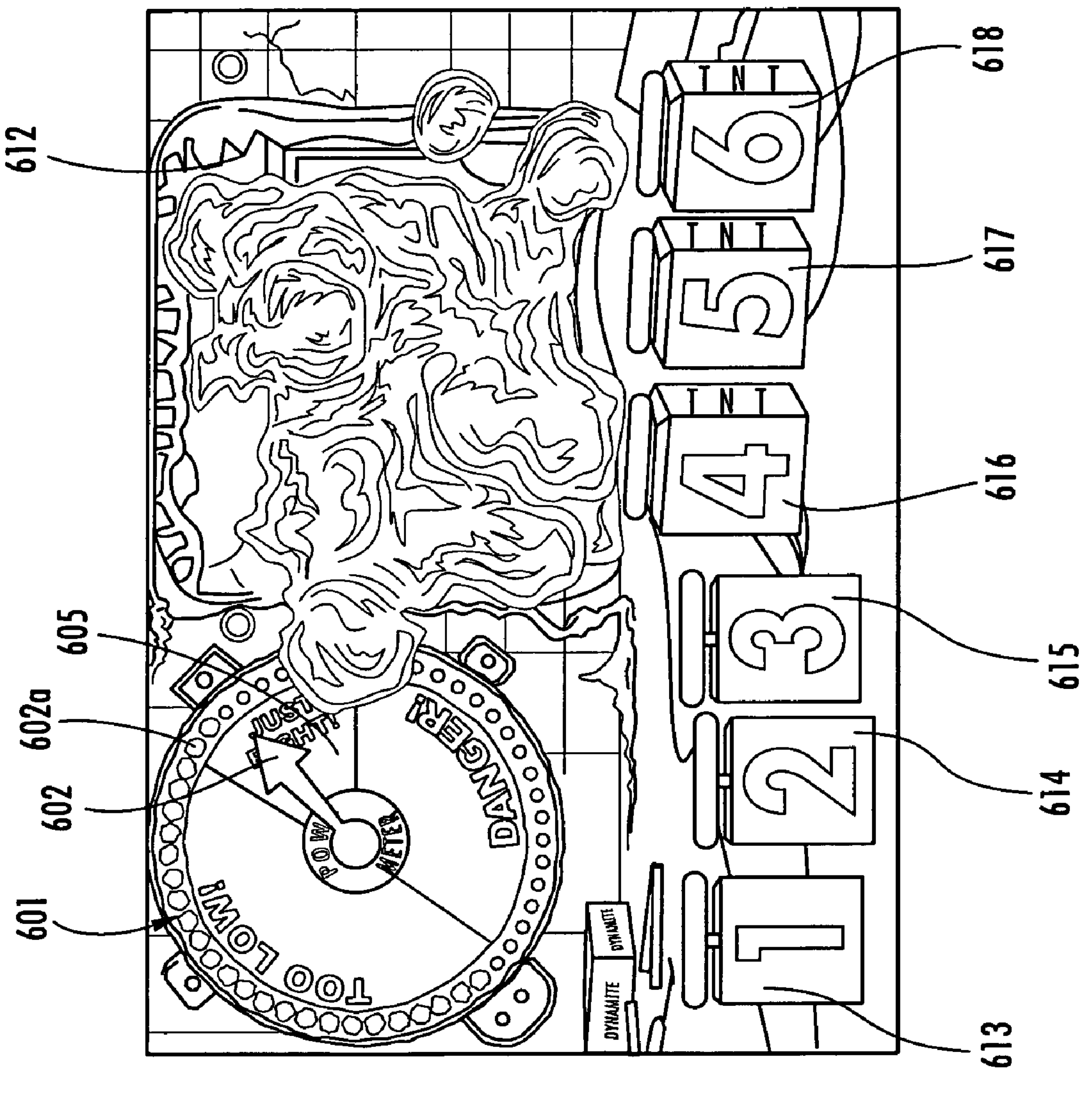
FIG. 32 is an illustration of one embodiment of a screen shot showing that the selected fourth, fifth and sixth detonators was just right to blow the vault.

Depicted in FIG. 32 is what happens when the correct amount of simulated explosive charge is selected. In this example, explosive charges "1", "2" and "3" (613–615) are selected by the player. An explosion "blasts open" the vault door 612. The power meter 601 is slightly damaged, while pointer 602 and lights 602A point into the "JUST RIGHT" range area 605 of the power meter 601.

Figure 33:
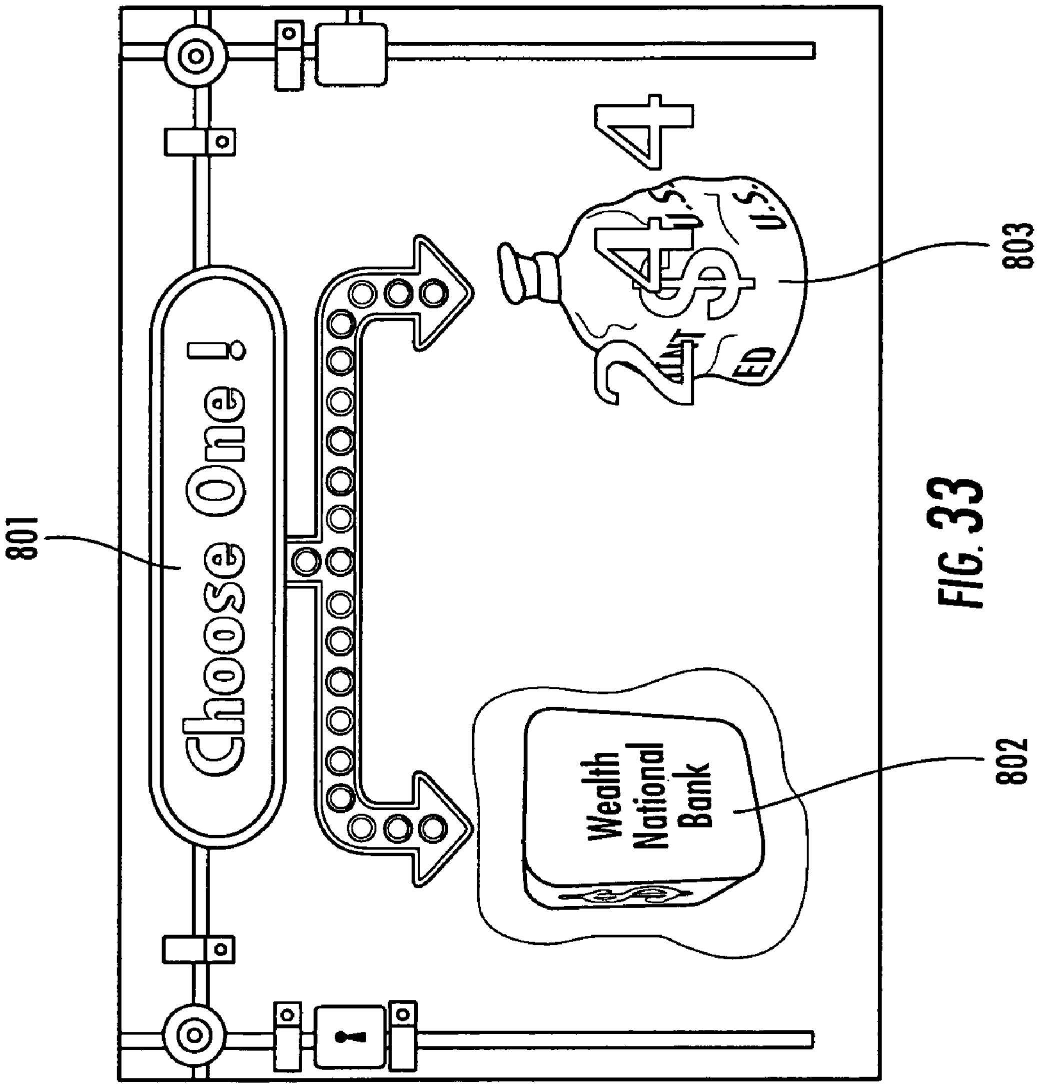
FIG. 33 is an illustration of one embodiment of a screen shot illustrating the choice between playing again or cashing out.

Upon selection of the proper amount of explosive charge, the vault door 612 is then opened. The player may then be given the choice, as shown in FIG. 33, of continuing to the vault or "cashing in" and taking the "244" total points by touching the areas 802 and 803 associated with the choices.

Figure 34:
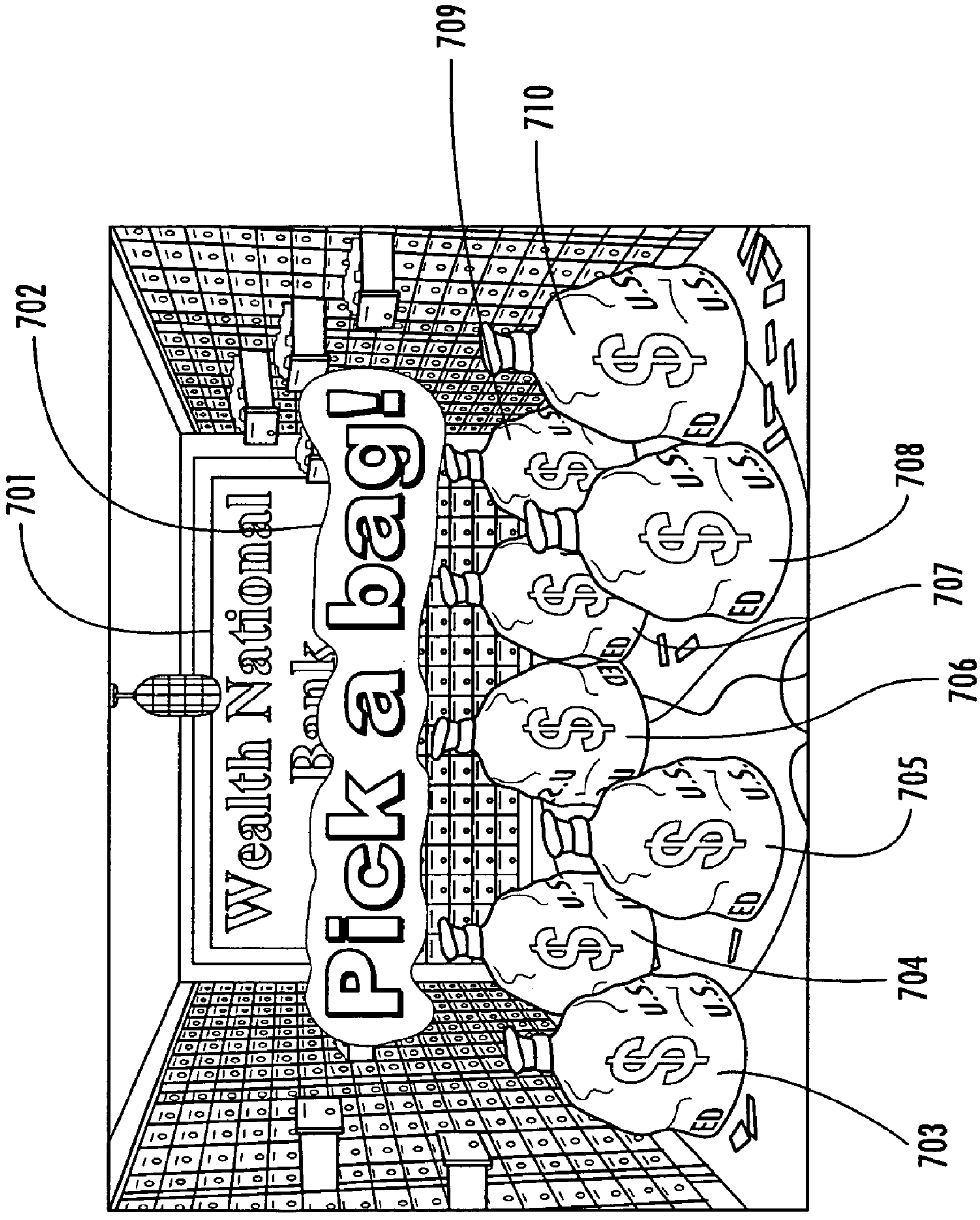
FIG. 34 is an illustration of one embodiment of a screen shot of the inside of the bank vault showing a plurality of bags for the player to choose.
Figure 35:
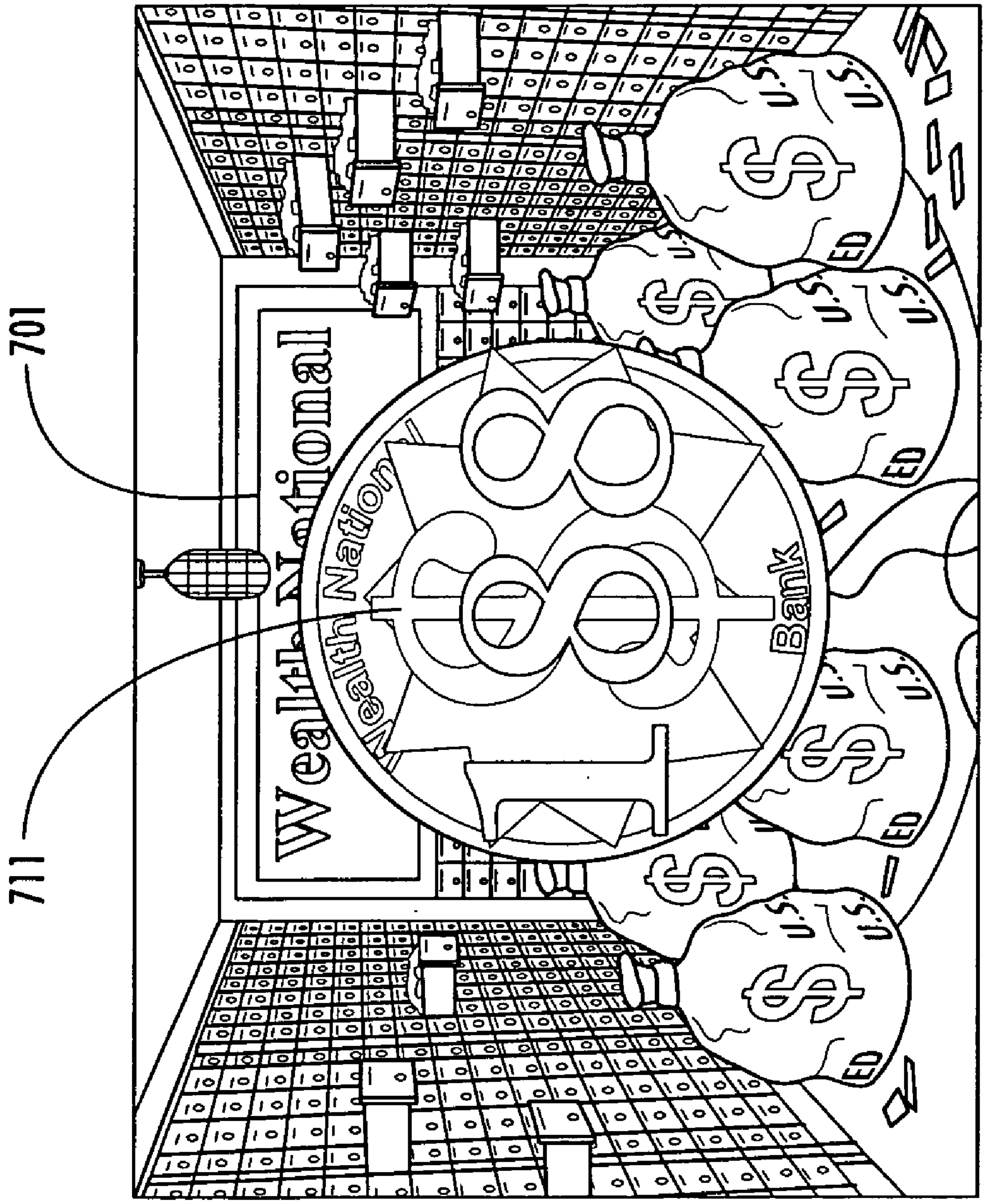
FIG. 35 is an illustration of one embodiment of a screen shot showing that the bag that the player chose was worth 188 points or credits.
Figure 36:
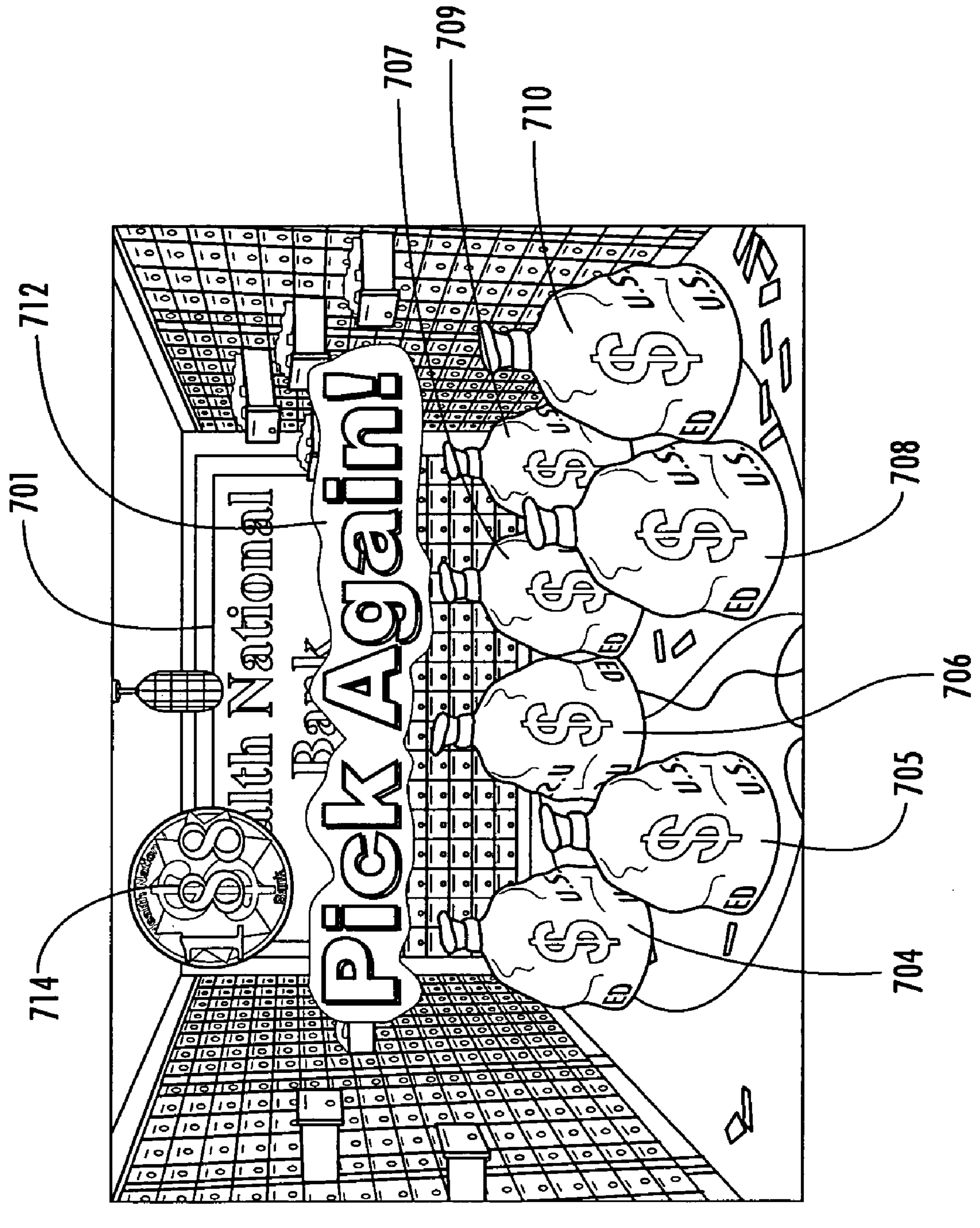
FIG. 36 is an illustration of one embodiment of a screen shot illustrating that the player has won 188 credits and may pick again.
Figure 37:
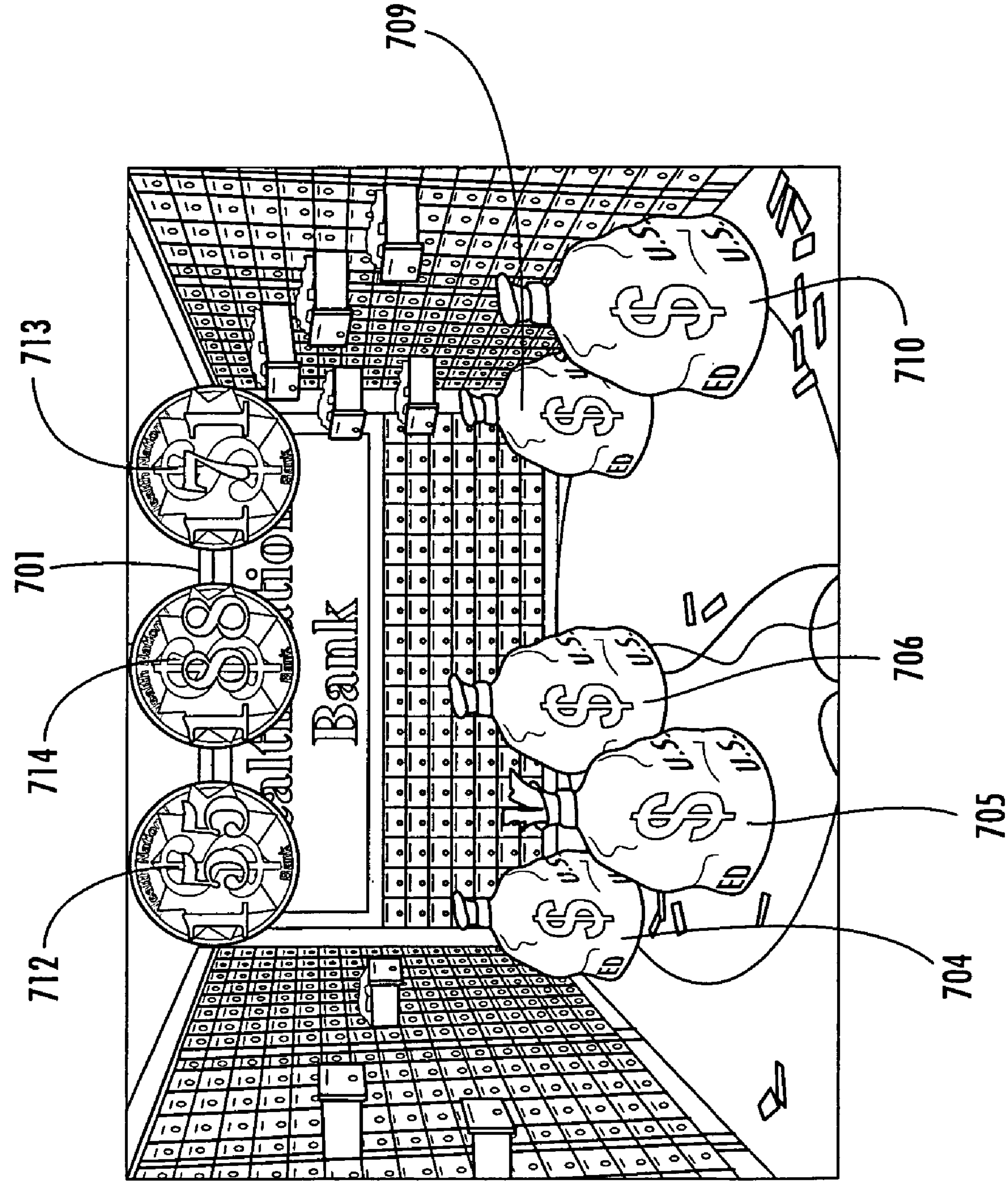
FIG. 37 is an illustration of one embodiment of a screen shot showing that the player has selected three bags worth 155, 188 and 171 credits.

If the player elects to continue to the vault, screen shot 700 of FIG. 34 shows the bank vault interior 701 containing a plurality of moneybags 703–710. The player is then prompted by a message 702 to "PICK A BAG". In this example, the player picks bag 703 by using the selection device 70 (e.g., pressing an area on the touch screen) and in FIG. 35 the contents of Bag 703 is revealed as "188" points in display area 711. In FIG. 36, the player is prompted by a message 712 to "PICK AGAIN" and the amount from bag 703 is displayed in display 714. In the present example, the player picks again until three bags are picked. As shown in FIGS. 36 and 37, bags 707 and 708 are picked and shown to contain "155" points and "171" points, respectively, in display areas 712 and 713.

While an bank vault door having a series of explosives is shown and disclosed as the third level, it is appreciated that the third level may include any type of game level associated with a bank robbery and not depart from the scope of the present invention. For example, the third level may include, but is not limited to, another slot machine game whereby one of a predetermined winning outcome must be attained in order to open the inner gate.

Figure 38:
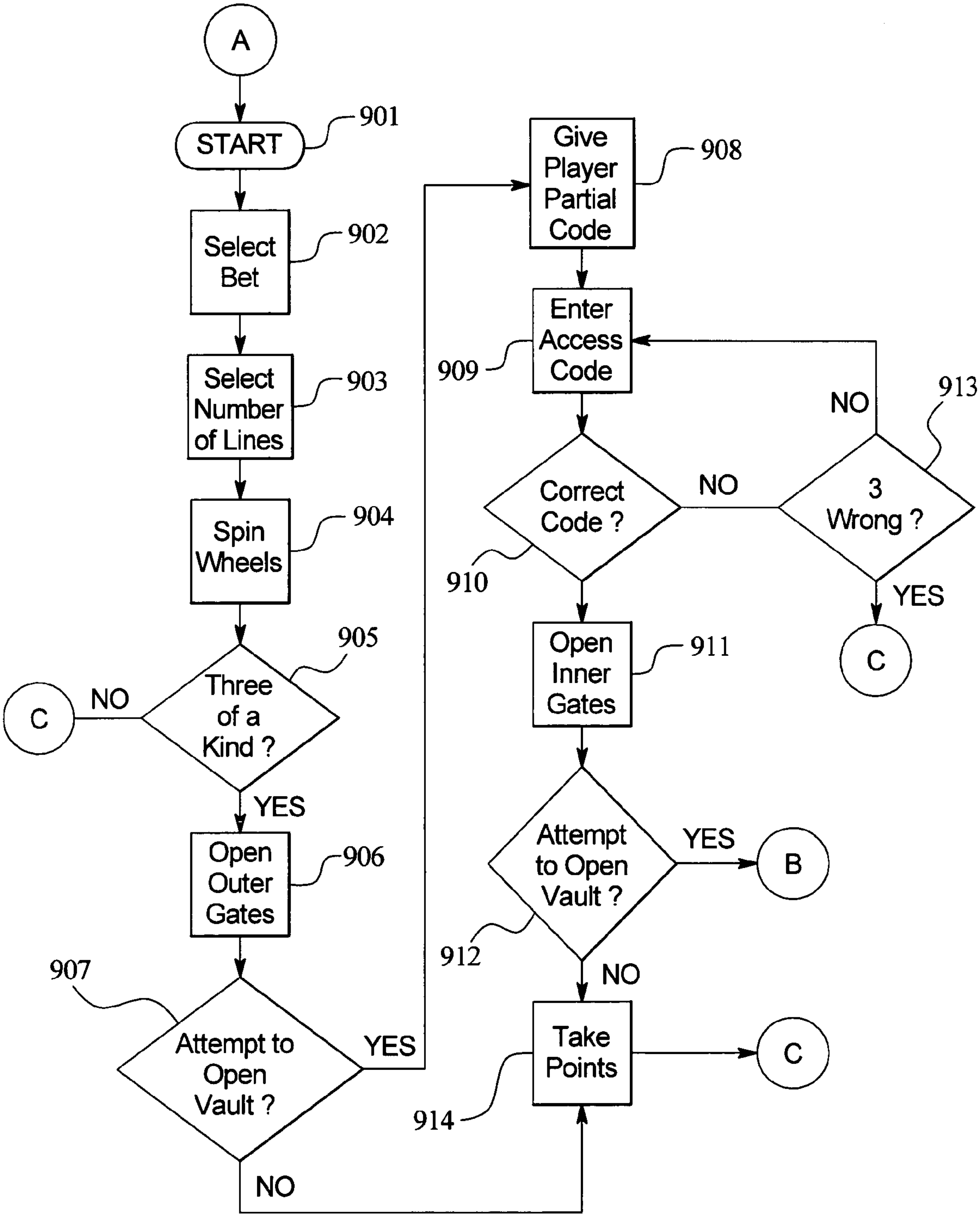
FIGS. 38–40 are simplified flow charts of the operation of a preferred embodiment of the game.
Figure 39:
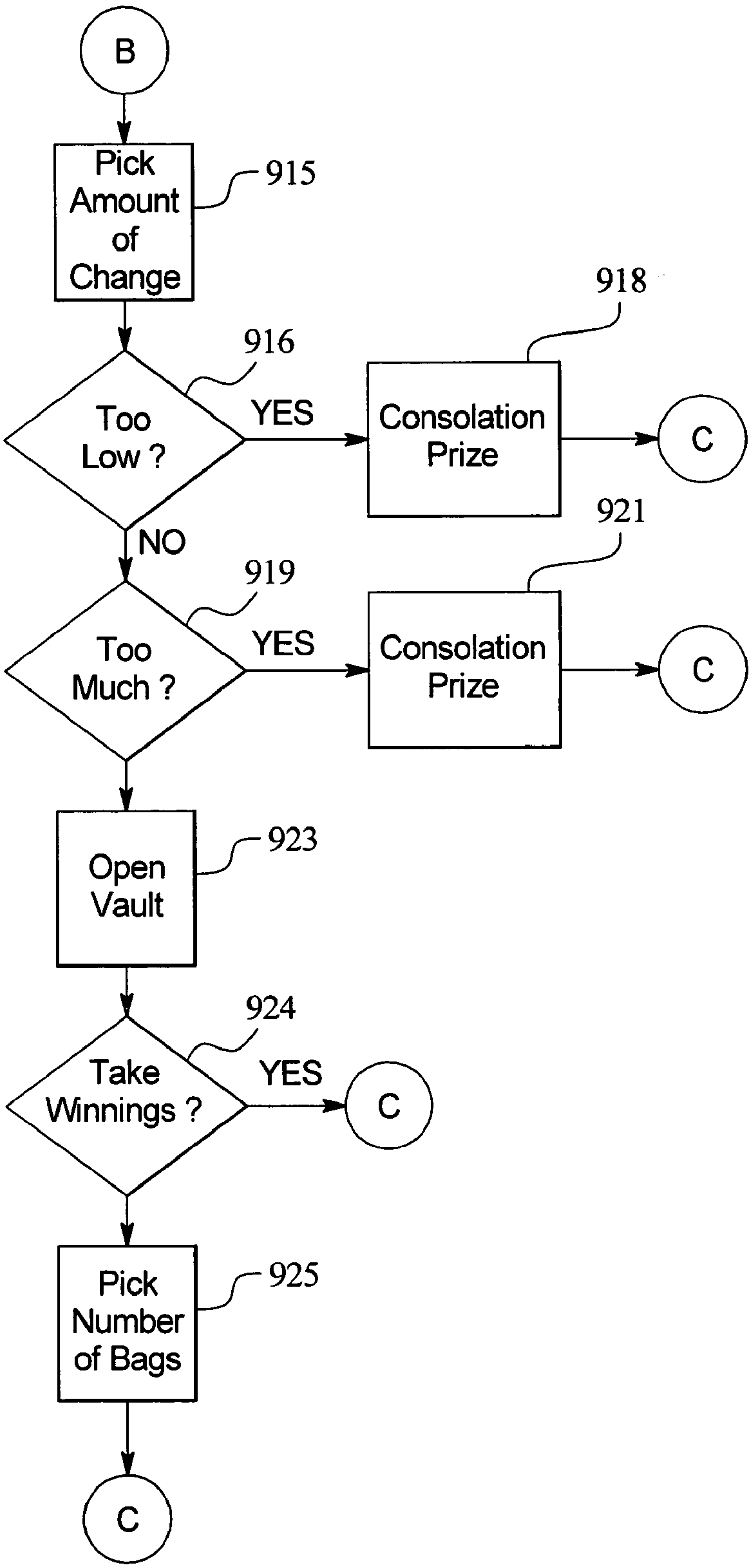
Figure 40:
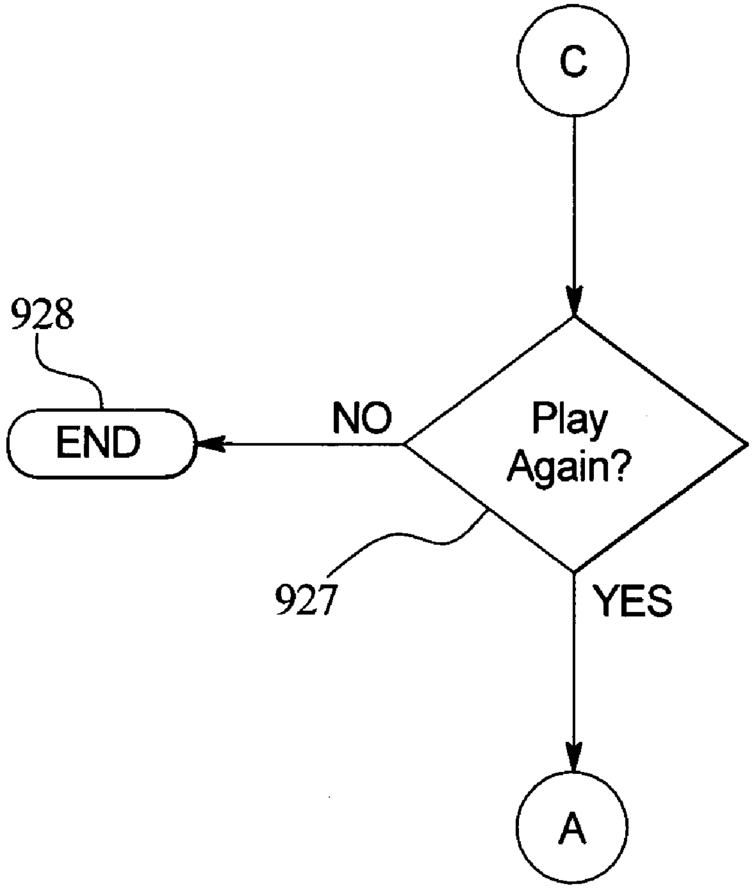

FIGS. 38–40 are flow diagrams of the way one embodiment of the present invention operates. As shown in FIG. 38, play may be initiated in step 901 by inserting coins, paper currency, tokens, a credit card, a smart card or the like to activate the slot machine. After initiating the start of the game, the number of slot lines and the bet are selected in steps 902 and 903. If the player's bet exceeds the amount already inputted into the machine, the slot machine will prompt for additional payment to be inserted. Once it is determined that sufficient funds have been inputted, the slot wheels are spun in step 904.

In order to inform players of possible winning results, a key or other index preferably lists pre-selected winning results, such as, but not limited to, three of a kind. If a winning result does not appear in the selected designated line(s) in step 905, the slot machine will display a message inquiring whether an additional game is desired in step 927. If an additional game is desired, the previous steps may be repeated. Otherwise, the game will end in step 928.

Returning to FIG. 38, if "3 of a kind" does come up, the outer gates 18 are opened in step 906. The slot machine then displays a message inquiring in step 907 whether the player would like to continue trying to open the vault. If the player decides not to continue to open the vault, the player may "take" his or her accumulated points in step 914. The player may thereafter decide whether to play again or quit in steps 927 and 928.

If the player chooses to continue attempting to open the vault in step 907, play of the game moves onto the next level. In step 909, the player attempts to guess the correct security access code. Depending on the particular winning result or otherwise, the slot machine may provide a partial access code to the player in step 908. Preferably, the player will be provided with several attempts to determine or guess the winning access code. Upon the entering of an attempt, the slot machine will indicate whether the attempt is correct. If the attempt is displayed as being wrong in step 913, and provided that the player has not exhausted all of the predetermined number of attempts, the player may input an additional access code in step 909. In order to assist in the determination of the access code, the slot machine may indicate to the player when numbers are correct. For example, the slot machine may indicate that the player has selected a certain number of correct numbers, or may display the numbers that are correct. If the correct code is not entered before the number of chances is expunged, the game will end. The player may thereafter decide whether to play again or quit in steps 927 and 928. On the other hand, if the correct code is entered before the predetermined number of attempts is exhausted in step 910, the inner gate 18 is opened in step 911: The slot machine then prompts the player to choose to "cash out" or continue playing in step 912. If the player chooses to "cash out", the player takes his or her points in step 914. The player may thereafter decide whether to play again or quit in steps 927 and 928.

If the player decides to keep playing, as shown in FIG. 39, the player must select the correct amount of simulated explosive charge 606–611 to use on the vault doors 60 in step 915. If the selected explosive charge is determined to be too little in step 916, the vault door will not open and the player will receive a consolation prize 622 in step 918. The player may thereafter decide whether to play again or quit in steps 927 and 928. Similarly, if it is determined that too much explosive is used in step 919, the vault and its contents are damaged and the player will receive a consolation prize 622 in step 921. The player may thereafter decide whether to play again or quit in steps 927 and 928.

Figure 29:
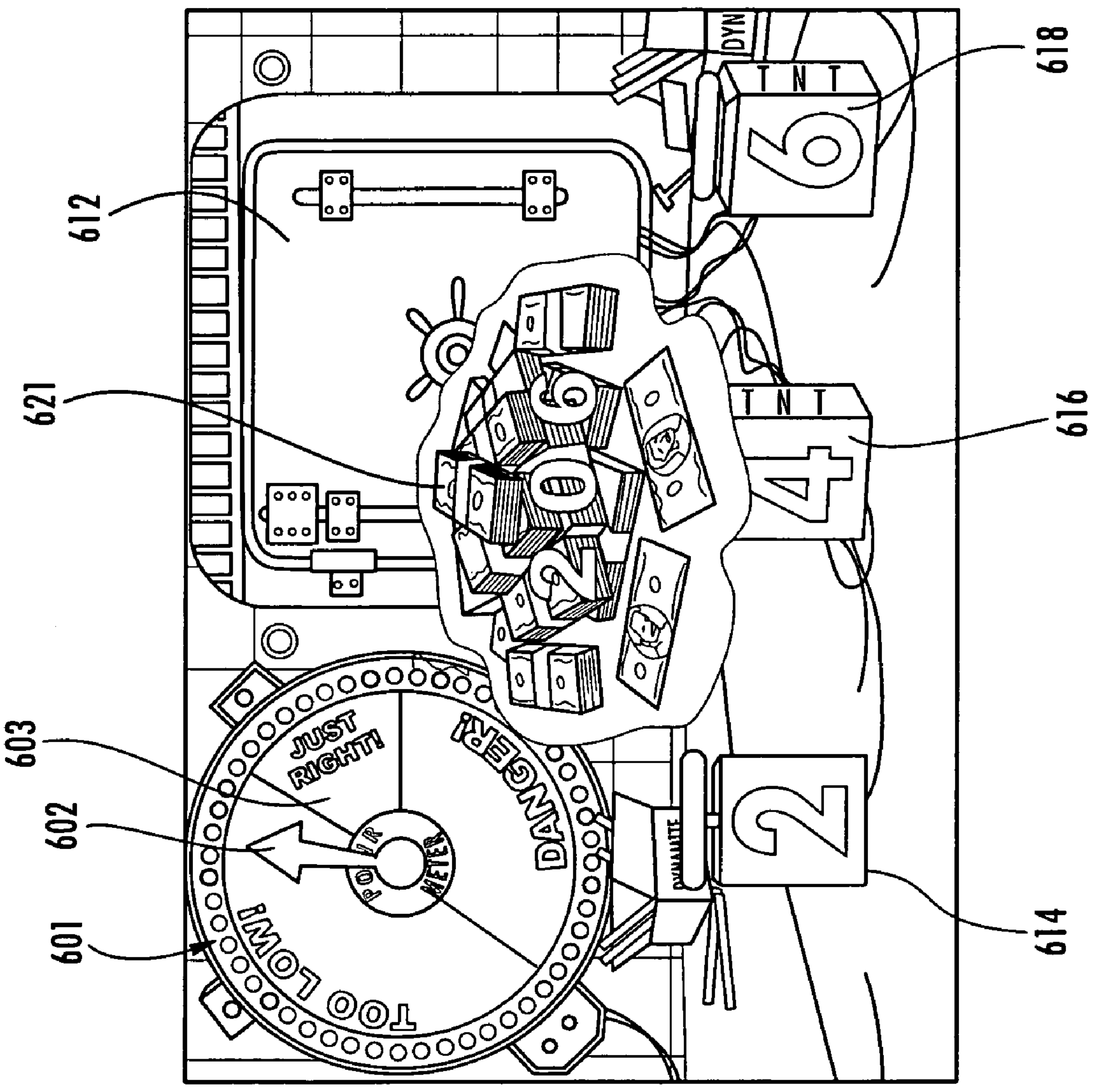
FIG. 29 is an illustration of one embodiment of a screen shot showing that the selected explosive charges from FIG. 28 was inadequate to blow the vault and that the player receives a consolation prize.

If the correct amount of explosives is used, as shown in FIG. 29, the vault contents are revealed in step 923. The player may then choose either a specific prize amount in step 924 or take his or her chances on receiving the contents of a specific number of bags in step 925. Once the player has cashed out by taking the winnings or picking a number of bags, the player may decide in step 927 whether to play an additional game.

While the figures and description relate to slot machine game having a mechanical assembly, it is appreciated that the present invention may be played in connection with an Australian or video slot machine, whereby the various doors and gates of the various game levels will be displayed on a video display.

The foregoing description of one or more embodiments of the invention have been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims as set forth below.

What is claimed is:

1. A method for a player to play a game on a slot machine gaming device including opening one or more outer closures and an inner closure by playing a series of game levels, wherein the slot machine gaming device includes a slot machine assembly having a plurality of reels having symbols thereon, the method comprising the steps of:

a) playing a first game level in an effort to attain a first winning result;

b) determining whether said first winning result was attained for said first game level;

c) opening the outer closure if it is determined that a first winning result was attained for said first game level;

d) playing a second game level in an effort to attain a second winning result, wherein said first or second game level is played on said slot machine assembly;

e) determining whether said second winning result was attained for said second game level;

f) opening the inner closure if it is determined that said second winning result was attained for the second game level; and g) determining whether the player wins an award.

2. The method according to claim 1 wherein said inner and outer closures simulate doors and gates of a bank vault.

3. The method according to claim 1 wherein the step of opening said inner closure serves to reveal a display.

4. The method according to claim 3 wherein said display comprises a video screen.

5. The method according to claim 1 wherein said outer closure comprises one or more gates capable of being opened and closed.

6. The method according to claim 5 wherein said outer closure includes a first simulated bank gate and a second simulated bank gate.

7. The method according to claim 6 wherein said second simulated bank gate comprises a vertically retractable roll up gate that extends across the front of said inner closure when extended.

8. The method according to claim 6 wherein said first simulated bank gate comprises a horizontally retractable pair of side gates which serve to extend across said inner door when extended.

9. The method according to claim 1 wherein said inner closure comprises one or more doors capable of being opened and closed.

10. The method according to claim 1 wherein the playing of at least one of said first and second game levels comprises deactivating a simulated alarm system.

11. The method according to claim 10 wherein said step of playing at least one of said first and second game levels to open said outer or inner closure comprises the steps of:

selecting a series of numbers as an access code for said simulated alarm system;

enabling said player to attempt to identify said numbers of said series within a predetermined number of attempts; and, opening said inner or outer closure if said access code is identified by said player within said predetermined number of attempts.

12. The method according to claim 11 which further includes the step of providing a portion of said series of numbers to said player without disclosing said entire series of numbers to said player.

13. The method according to claim 1 wherein said method further comprises the step of providing the player with the choice of continuing to play or taking a prize after attaining said first winning result for said first game level.

14. The method according to claim 1 wherein said method further comprises the step of providing a consolation prize to said player when said player fails to win said first or second game level.

15. The method according to claim 1 wherein said method further comprises the step of providing said player with the option of picking a specific award or a game of chance to determine the amount of said award when said second winning result for said second game level is attained.

16. The method according to claim 1 wherein said first game level comprises a standard slot machine game having a plurality of symbols.

17. The method according to claim 16 wherein said first winning result comprises a predetermined set of said symbols.

18. The method according to claim 1 further including:

drive means operably connected to said outer and inner closures;

control means operably connected to said drive means;

motor means operably connected to said control means and said drive means for selectively opening and closing said outer and inner closures.

19. The method according to claim 1 further including the step of simulating sparks and explosions using at least one flash tube.

20. The method according to claim 1 further including visible moving gears or mechanical machinery on said exterior of said gaming machine to attract potential players.

21. The method according to claim 1 further including means to provide audio to simulate the sounds of a simulated bank robbery.

22. A method for a player to play a game on a gaming machine including opening one or more outer closures and an inner closure by playing a series of game levels, comprising the steps of:

playing a first game level in an effort to attain a first winning result;

determining whether said first winning result was attained for said first game level;

opening the outer closure if it is determined that a first winning result was attained for said first game level;

playing a second game level in an effort to attain a second winning result;

selecting a number representing a correct amount of simulated explosive charge needed to open said inner closure;

preventing said player from knowing said correct amount of simulated explosive charge;

enabling said player to try to guess said correct amount of simulated explosive charge; and, opening said inner closure and enabling said player to choose said award if said correct amount of simulated explosive charge is guessed by said player so as to reward said player for doing so.

23. The method according to claim 22 wherein guessing said correct amount of simulated explosive charge simulates the blowing open of said inner closure.

24. The method according to claim 23 wherein said method further comprises the step of indicating whether an incorrect amount of explosive charge is guessed by the player.

25. A method for a player to play a slot machine gaming device simulating a robbery including at least one outer gate, one inner gate and an inner door, wherein the slot machine gaming device includes a mechanical vault assembly and a slot machine assembly, the slot machine assembly having a plurality of reels having symbols thereon, the method comprising the steps of:

a) playing a first game level on said slot machine assembly;

b) determining whether a winning result in the form of a predetermined series of said symbols was attained for said first game level;

c) opening said outer gate if it is determined that said winning result was attained for said first game level;

d) playing a second game level;

e) determining whether a winning result was attained for said second game level;

f) opening said inner gate if it is determined that a winning result was attained for the second game level; and g) playing a third game level;

h) determining whether a winning result was attained for said third game level;

i) opening said inner door if it is determined that a winning result was attained for said third game level; and j) determining whether the player wins an award.

26. The method according to claim 25 wherein said step of playing said second game level to open said inner gate comprises the steps of:

selecting a series of numbers as an access code for said simulated alarm system;

enabling said player to attempt to identify said numbers of said series within a predetermined number of attempts; and, opening said outer closure if said access code is identified by said player within said predetermined number of attempts.

27. The method according to claim 26 wherein said third game level to open said inner door comprises the steps of:

selecting a number representing a correct amount of simulated explosive charge needed to open said inner door;

preventing said player from knowing said correct amount of material;

enabling said player to try to guess said correct amount of simulated material; and, opening said inner door and enabling said player to choose said award if said correct amount of material is guessed by said player so as to reward said player for doing so.

28. A slot machine gaming device having a plurality of reels having symbols thereon to be played by at least one player simulating a robbery capable of producing video and audio portions of a game having a series of game levels, the gaming device comprising:

a control device;

first and second display devices for displaying the video portion of said game;

an input device to be used by said player to play said game;

at least one closure at least partially blocking at least one of said first and second display devices and capable of partially unblocking at least a portion of at least one of said first and second display devices as part of playing one of said game levels of said game on said slot machine;

at least one motor operably connected to said closure to at least partially block and partially unblock said at least one of said first and second display devices; and, whereby said control device being operably attached to said input device, said motor and said display for responding to said input device and controlling said game.

29. The gaming device according to claim 28 wherein said closure comprises at least one simulated bank vault gate or door serving to at least partially block said display device.

30. The gaming device according to claim 28 wherein said closure is opened by successfully playing at least one game level.

31. The gaming device according to claim 28 wherein said closure comprises an outer closure and an inner closure.

32. The gaming device according to claim 31 wherein said outer closure is a first simulated bank gate.

33. The gaming device according to claim 32 wherein said outer closure further includes a second simulated bank gate.

34. The gaming device according to claim 33 wherein said second simulated bank gate comprises a vertically retractable roll-up gate that extends across the front of said inner closure when extended.

35. The gaming device according to claim 33 wherein said inner closure comprises a pair of simulated bank vault doors capable of being selectively opened and closed.

36. The gaming device according to claim 32 wherein said first simulated bank gate comprises a horizontally retractable pair of side gates which serve to extend across said inner door when extended.

37. The gaming device according to claim 31 further including:

drive means operably connected to said outer and inner closures;

control means operably connected to said drive means;

motor means operably connected to said control means and said drive means for selectively opening and closing said outer and inner closures.

38. The gaming device according to claim 28 wherein said game comprises deactivating a simulated alarm system.

39. The gaming device according to claim 38 wherein said game level to unblock at least one closure comprises:

a series of numbers selected by said control device as an access code for said simulated alarm system, wherein said at least one closure is opened if said access code is ascertained within said predetermined number of attempts.

40. The gaming device according to claim 28 further including at least one flash tube to simulate sparks and explosions in response to playing said game.

41. The gaming device according to claim 28 further including visible moving gears or other mechanical machinery on said exterior of said gaming device to attract potential players.

42. The gaming device according to claim 28 further including a sound system for simulating the sounds of a simulated bank robbery.

43. The gaming device according to claim 28 wherein opening said at least one closure serves to reveal a display on at least one of said first and second display devices.

44. The gaming device according to claim 43 wherein said display on at least one of said first and second display devices comprises a video screen.

45. The gaming device according to claim 28 wherein said at least one closure comprises one or more gates capable of being opened and closed.

46. The gaming device according to claim 28 wherein said at least one closure comprises one or more doors capable of being opened and closed.

47. A gaming machine to be played by at least one player simulating a robbery capable of producing video and audio portions of a game having a series of game levels, the gaming machine comprising:

a control device;

first and second display devices for displaying the video portion of said game;

an input device to be used by said player to play said game;

at least an outer closure and an inner closure at least partially blocking at least one of said first and second display devices and capable of partially unblocking at least a portion of at least one of said first and second display devices as part of playing one of said game levels of said game, wherein said game level to unblock said inner closure comprises:

a number representing a correct amount needed to unblock said inner closure selected by said control device, wherein said correct amount being at least partially hidden from said player, and wherein said inner closure is opened and said player is enabled to choose said award if said correct amount is identified by said player, so as to reward said player for doing so;

at least one motor operably connected to said at least an outer closure and an inner closure to at least partially block and partially unblock said at least one of said first and second display devices; and, whereby said control device being operably attached to said input device, said motor and said display for responding to said input device and controlling said game.

48. The gaming machine according to claim 47 wherein said amount is the amount of simulated explosive charge to be used to simulate the blowing open of at least one of said closures.

* * * * *